US006834961B1

(12) United States Patent
Cobb et al.

(10) Patent No.: US 6,834,961 B1
(45) Date of Patent: Dec. 28, 2004

(54) AUTOSTEREOSCOPIC OPTICAL APPARATUS

(75) Inventors: Joshua M. Cobb, Victor, NY (US); David Kessler, Rochester, NY (US); James E. Roddy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/662,208

(22) Filed: Sep. 12, 2003

(51) Int. Cl.$^7$ ..................... G03B 21/00; G03B 21/28; G02F 1/1335

(52) U.S. Cl. ................. 353/7; 353/98; 349/15

(58) Field of Search .................. 353/7–10, 20, 353/98, 99, 28, 34, 37, 122; 349/15; 359/462–479

(56) References Cited

U.S. PATENT DOCUMENTS

| | | | | |
|---|---|---|---|---|
| 5,483,307 A | * | 1/1996 | Anderson | 353/98 |
| 5,625,372 A | | 4/1997 | Hildebrand et al. | 345/8 |
| 5,754,344 A | * | 5/1998 | Fujiyama | 359/631 |
| 5,908,300 A | | 6/1999 | Walker et al. | 434/30 |
| 6,014,164 A | * | 1/2000 | Woodgate et al. | 348/51 |
| 6,416,181 B1 | * | 7/2002 | Kessler et al. | 353/7 |
| 6,511,182 B1 | * | 1/2003 | Agostinelli et al. | 353/7 |
| 6,550,918 B1 | * | 4/2003 | Agostinelli et al. | 353/7 |
| 6,702,442 B2 | * | 3/2004 | Agostinelli et al. | 353/7 |
| 6,768,585 B2 | * | 7/2004 | Agostinelli et al. | 359/466 |

FOREIGN PATENT DOCUMENTS

EP 764 869 A2 3/1997

OTHER PUBLICATIONS

S. Pastoor and M. Wopking; "3–D displays: A review of current technologies" Displays 17, 1997, pp. 100–110.
K. Hopf; "An Autostereoscopic Display Providing Comfortable Viewing Conditions and a High Degree of Telepresence" IEEE Transactions on Circuits for Video Technology, vol. 10, No. 3, Apr. 2000, pp. 359–365.
W. Smith; "Modern Optical Engineering, The Design of Optical Systems" pp. 212–213.
W. Smith; "Modern Optical Engineering, The Design of Optical Systems" pp. 393–394.

* cited by examiner

Primary Examiner—Judy Nguyen
Assistant Examiner—Andrew Sever
(74) Attorney, Agent, or Firm—Nelson Adrian Blish

(57) ABSTRACT

An autostereoscopic optical apparatus (10) provides a stereoscopic virtual image to be viewed by an observer at a left viewing pupil (14*l*) and a right viewing pupil (14*r*). Apparatus (10) has left and right image generation systems (100*l*) for forming left and right curved images, each image generation system having a curved mirror (92), a beamsplitter (102) disposed between the vertex of the curved mirror (92) and the mirror's center of curvature, and an image source (94) for providing image-bearing light to the curved mirror (92). The curved mirror (92) cooperates with the beamsplitter to form an intermediate image of the image source (94). A field lens (112) is disposed near the intermediate image for imaging the mirror center of curvature toward the image center of curvature. A ball lens segment (130) is centered at the image center of curvature for forming the curved image from the intermediate image. A ball lens imaging spherical mirror (24) cooperates with a beamsplitter (16) to form images of left and right ball lens segments (130*l*, 30*r*) at left and right viewing pupils (14*l*, 14*r*).

88 Claims, 17 Drawing Sheets

AUTOSTEREOSCOPIC OPTICAL APPARATUS

CROSS REFERENCE TO RELATED APPLICATIONS

Reference is made to commonly-assigned copending U.S. patent application Ser. No. 10/393,236, filed Mar. 20, 2003, entitled METHOD AND APPARATUS FOR MONOCENTRIC PROJECTION OF AN IMAGE, by Joshua M. Cobb, the disclosure of which is incorporated herein.

FIELD OF THE INVENTION

This invention generally relates to display apparatus and more particularly relates to an autostereoscopic display apparatus providing a wide field of view, large viewing pupils, and high brightness.

BACKGROUND OF THE INVENTION

The potential value of autostereoscopic display systems is well appreciated for a broad range of data visualization uses and for a wide range of applications that include entertainment, engineering, medical, government, security, and simulation fields. Autostereoscopic display systems include "immersion" systems, intended to provide a realistic viewing experience for an observer by visually surrounding the observer with a three-dimensional (3-D) image having a very wide field of view. As differentiated from the larger group of stereoscopic displays that include it, the autostereoscopic display is characterized by the absence of any requirement for a wearable item of any type, such as goggles, headgear, or special polarized or filter glasses, for example. That is, an autostereoscopic display attempts to provide "natural" viewing conditions for an observer.

An article entitled "3-D displays: A review of current technologies" by Siegmund Pastoor and Mathias Wopking in *Displays* 17 (1997) surveys various approaches that have been applied for obtaining autostereoscopic display images for one or more viewers. Among the many techniques described in the Pastoor et al. article are electro-holography, volumetric display, direction-multiplexed, diffraction-based, refraction-based, and reflection-based methods for autostereoscopic presentation. While each of these approaches may have merit in one or more specific applications, these approaches have a number of characteristic shortcomings that constrain usability and overall performance. As a group, these conventional approaches have been adapted for autostereoscopic displays, but allow only a narrow field of view and provide limited brightness and poor contrast. Imaging systems employing time-based or spatial multiplexing require complex image processing algorithms in order to provide left- and right-eye images in the proper sequence or with the necessary spatial separation. Time-based multiplexing introduces the inherent problem of image flicker. Spatial multiplexing generally produces an image having reduced resolution. Combining these multiplexing techniques, as is disclosed in European Patent Application EP 0 764 869 A2 to Ezra et al., may provide an increased number of views, but does not compensate for these inherent drawbacks. A number of multiplexing technologies also require tracking of view eye position and compensation for changes in head position. As a further disadvantage, each of the imaging technologies described in the Pastoor et al. article present the viewer with a real image, rather than with a virtual image.

In an article entitled "An Autostereoscopic Display Providing Comfortable Viewing Conditions and a High Degree of Telepresence" by Klaus Hopf in *IEEE Transactions on Circuits and Systems for Video Technology*, Vol. 10, No. 3, April, 2000, a teleconferencing system employing a spherical mirror is disclosed, recommended particularly for its value in reducing chromatic aberration. However, the optical system disclosed in this article is subject to field curvature constraints, limiting its field of view. Notably, the system described in the Hopf article provides a virtual image; however, due to substantial field curvature, the total field of view of such a system is limited to less than about 15 degrees. While such a narrow field of view may be acceptable for videoconferencing applications, this level of performance would not be useful for a desktop display system.

Virtual imaging provides an advantageous alternative to real image projection, as is used in the apparatus described in the Pastoor article and in EP 0 764 869 A2. In contrast to conventional projection methods for forming a real image, a virtual image is not formed on a display surface. That is, if a display surface were positioned at the perceived location of a virtual image, no image would be formed on that surface. Virtual image display has a number of inherent advantages, as is outlined in U.S. Pat. No. 5,625,372 (Hildebrand et al.) As one significant advantage for stereoscopic viewing, the size of a virtual image is not limited by the size or location of a display surface. Additionally, the source object for a virtual image may be small; a magnifying glass, as a simple example, provides a virtual image of its object. Thus, it can be seen that, in comparison with prior art systems that project a real image, a more realistic viewing experience can be provided by forming a virtual image that is disposed to appear some distance away. Providing a virtual image also obviates any need to compensate for screen artifacts, as may be necessary when projecting a real image.

It is generally recognized that, in order to minimize vergence/accommodation effects, a 3-D viewing system should display its pair of stereoscopic images, whether real or virtual, at a relatively large distance from the observer. For real images, this means that a large display screen must be employed, preferably placed a good distance from the observer. For virtual images, however, a relatively small curved mirror can be used as is disclosed in U.S. Pat. No. 5,908,300 (Walker et al.). The curved mirror acts as a collimator, forming a virtual image at a relatively large distance from the observer.

From an optical perspective, it can be seen that there would be advantages to autostereoscopic design using pupil imaging. A system designed for pupil imaging must meet a fairly demanding set of requirements, including the following:

(a) form separate images at left and right pupils correspondingly;
(b) provide the most natural viewing conditions, eliminating any need for goggles or special headgear;
(c) present the largest possible pupils to the observer, while limiting crosstalk between left and right views;
(d) allow reasonable freedom of movement;
(e) provide an ultra-wide field of view; and
(f) provide sufficient resolution for realistic imaging, with high brightness and contrast.

It is recognized in the optical arts that each of these requirements, by itself, can be difficult to achieve. An ideal autostereoscopic imaging system must meet the challenge of each of these requirements to provide a more fully satisfactory and realistic viewing experience. Moreover, additional physical constraints presented by the need for a system to have small footprint, and dimensional constraints for interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

Clearly, the value and realistic quality of the viewing experience provided by an autostereoscopic display system using pupil imaging is enhanced by presenting the stereo 3-D image with a wide field of view and large exit pupil. For fully satisfactory 3-D viewing, such a system should provide separate, high-resolution images to right and left eyes. To create a realistic illusion of depth and width of field, the observer should be presented with a virtual image that requires the viewer to focus at some distance.

It is well known that conflict between depth cues associated with vergence and accommodation can adversely impact the viewing experience. Vergence refers to the degree at which the observer's eyes must be crossed in order to fuse the separate images of an object within the field of view. Vergence decreases, then vanishes as viewed objects become more distant. Accommodation refers to the requirement that the eye lens of the observer change shape to maintain retinal focus for the object of interest. It is known that there can be a temporary degradation of a viewer's depth perception when the viewer is exposed for a period of time to mismatched depth cues for vergence and accommodation. It is also known that this negative effect on depth perception can be mitigated when the accommodation cues correspond to distant image position.

There are also other basic optical limitations for immersion systems that must be addressed with any type of optical projection that provides a wide field of view. An important limitation is imposed by the Lagrange invariant. A product of the size of the emissive device and the numerical aperture, the Lagrange invariant determines output brightness and is an important consideration for matching the output of one optical system with the input of another. Any imaging system conforms to the Lagrange invariant, whereby the product of pupil size and semi-field angle is equal to the product of the image size and the numerical aperture. An invariant that applies throughout the optical system, the Lagrange invariant can be a limitation when using, as an image generator, a relatively small spatial light modulator or similar pixel array which operate over a relatively small numerical aperture, since the Lagrange value associated with the device is small. In practical terms, the larger the size of the image source, the easier it is to form an image having a wide field of view and large pupil.

In response to the need for more realistic autostereoscopic display solutions offering a wide field of view, commonly assigned U.S. Pat. No. 6,416,181 (Kessler et al.), incorporated herein by reference and referred to as the '181 patent, discloses an autostereoscopic imaging system using pupil imaging to display collimated left and right virtual images to a viewer. In the '181 disclosure, a curved mirror is employed in combination with an imaging source, a curved diffusive surface, a ball lens assembly, and a beamsplitter, for providing the virtual image for left and right viewing pupils. Overall, the monocentric optical apparatus of the '181 disclosure provides autostereoscopic imaging with large viewing pupils, a very wide field of view, and minimal aberration.

While the autostereoscopic system of the '181 disclosure provides a high-performance immersive display, there is still room for improved embodiments. For example, while the '181 system provides a large viewing pupil, there would be advantages in even further increases in pupil size. At the same time, however, some amount of correction may be needed, since eye movement within a larger viewing pupil can cause some amount of "swim" effect, in which pixels appear to shift position as the eye moves within the viewing pupil. In addition, as is well known in the imaging arts, some amount of spherical aberration is generally inherent in any optical system that employs a curved mirror for image collimation.

Generating its source image on a small spatial light modulator device, the '181 system overcomes inherent Lagrange invariant conditions by forming an intermediate curved image for projection on a curved diffusive surface. Use of the diffuser with the '181 apparatus is necessary because the image-forming device, typically a reflective LCD or other spatial light modulator, is a relatively small emissive device, measuring typically no more than about 1 inch square. At the same time, however, the use of a diffusive surface effectively reduces overall brightness, introduces some level of graininess to the image, and limits the achievable contrast.

There are other minor drawbacks to autostereoscopic displays that use the design approach of the '181 disclosure. For example, slight "keystoning" aberrations are detectable in a system using the '181 design approach, due to the use of a single curved mirror; moreover, this effect is compounded by right and left images exhibiting keystoning in opposite orientations with respect to the final image. As another example, beamsplitter 16 deployment introduces other minor imaging aberrations, requiring the use of beamsplitting components that are very thin, fragile, and somewhat costly.

Thus, it can be seen that there is a need for an improved autostereoscopic imaging apparatus that provides improved brightness, enhanced viewing pupil dimensions, reduced image aberrations, and higher resolution.

SUMMARY OF THE INVENTION

It is an object of the present invention to provide an autostereoscopic display device having improved viewing pupil size, brightness, and resolution, with reduced optical aberrations. With this object in mind, the present invention provides an autostereoscopic optical apparatus for viewing a stereoscopic virtual image comprising a left image to be viewed by an observer at a left viewing pupil and a right image to be viewed by the observer at a right viewing pupil, the apparatus comprising:

(a) a left image generation system for forming a left curved intermediate image comprising:
  (i) a left curved mirror having a left mirror center of curvature;
  (ii) a left beamsplitter disposed between the vertex of the left curved mirror and the left mirror center of curvature;
  (iii) a left image source for providing light to the left curved mirror, the left curved mirror cooperating with the left beamsplitter to form a left intermediate image of the left image source, the left intermediate image having a left image center of curvature;
  (iv) a left ball lens segment, centered about the left image center of curvature, for forming the left curved intermediate image from the left intermediate image of the left image source;

(b) a right image generation system for forming a right curved intermediate image comprising:
  (i) a right curved mirror having a right mirror center of curvature;

(ii) a right beamsplitter disposed between the vertex of the right curved mirror and the right mirror center of curvature;

(iii) a right image source for providing light to the right curved mirror, the right curved mirror cooperating with the right beamsplitter to form a right intermediate image of the right image source, the right intermediate image having a right image center of curvature;

(iv) a right ball lens segment, centered about the right image center of curvature, for forming the right curved intermediate image from the right intermediate image of the right image source;

(c) a ball lens imaging curved mirror having a focal surface and having a center of curvature, the center of curvature placed substantially optically midway between the left ball lens segment and the right ball lens segment, wherein the left curved intermediate image from the left image generation system and the right curved intermediate image from the right image generation system lie substantially on the focal surface;

(d) a third beamsplitter disposed between the focal surface and the center of curvature of the ball lens imaging curved mirror, the ball lens imaging curved mirror and the third beamsplitter cooperating to form, at the left viewing pupil:

(i) a real image of the left ball lens segment; and
(ii) a virtual image of the left curved intermediate image;

the ball lens imaging curved mirror and the third beamsplitter further cooperating to form, at the right viewing pupil:

(i) a real image of the right ball lens segment; and
(ii) a virtual image of the right curved intermediate image.

It is a feature of the present invention that it provides a completely specular autostereoscopic imaging display apparatus, without the need for curved diffusive surfaces. This allows image brightness to be optimized and allows improved contrast over earlier design solutions.

It is an advantage of the present invention that it uses a larger imaging display than previous solutions, relaxing Lagrange invariant constraints on available luminance.

It is a further advantage of the present invention that it provides an improved viewing pupil size when compared with earlier solutions.

It is a further advantage of the present invention that it provides a compact autostereoscopic display system providing a virtual image.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

For the purposes of the present application, a curved image is an image for which best focus lies in a shape that is substantially spherical. The optical path is simplest when curved images are themselves spherically curved. By forming and using curved intermediate images, for example, rather than flat, planar images, the optics of the present invention take advantage of various symmetrical arrangements and relationships that are favorable for pupil imaging using virtual images, as is described in this section.

Similarly, for reasons that become apparent upon reading this detailed description, a curved mirror, as described in this application, is preferably spherical, having a single center of curvature.

Figure 1:
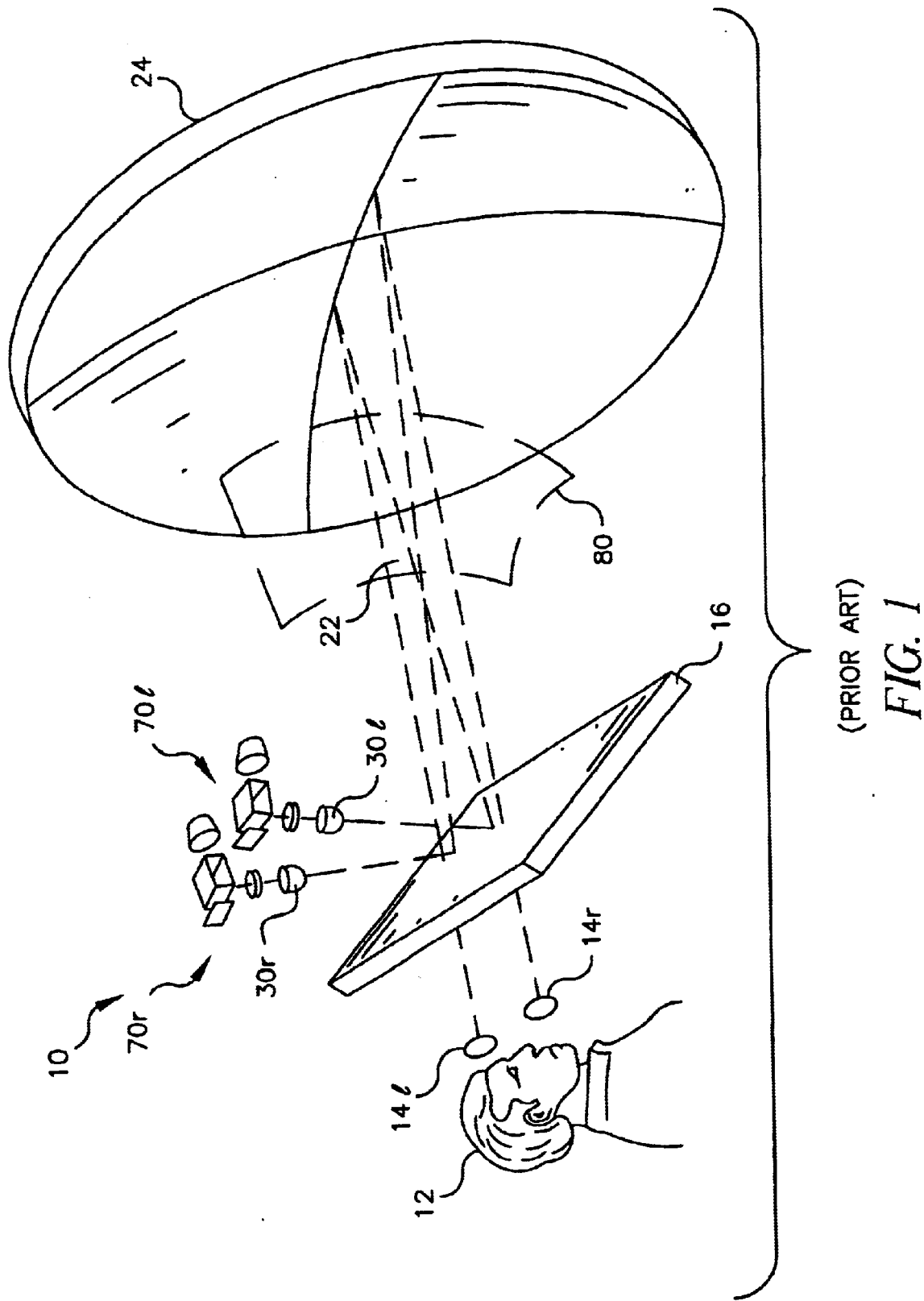
FIG. 1 shows a prior art autostereoscopic display system using pupil imaging to provide a virtual image.

In the prior art autostereoscopic projection apparatus 10 described in U.S. Pat. No. 6,416,181 and as shown in FIG. 1, a curved mirror 24 is employed, in combination with a beamsplitter 16 to provide an autostereoscopic virtual image to a viewer 12 at left and right viewing pupils 14*l* and 14*r*. For both left and right viewing pupils 14*l* and 14*r*, a corresponding image generation system 70*l* and 70*r* provides an initial intermediate curved image that is then projected through a corresponding left or right ball lens assembly 30*l*, 30*r* in order to form an intermediate curved image 80 at a focal surface of curved mirror 24. As FIG. 1 shows, the left and right optical paths cross between beamsplitter 16 and curved mirror 24, due to the nature of imaging using curved mirror 24.

Figure 2:
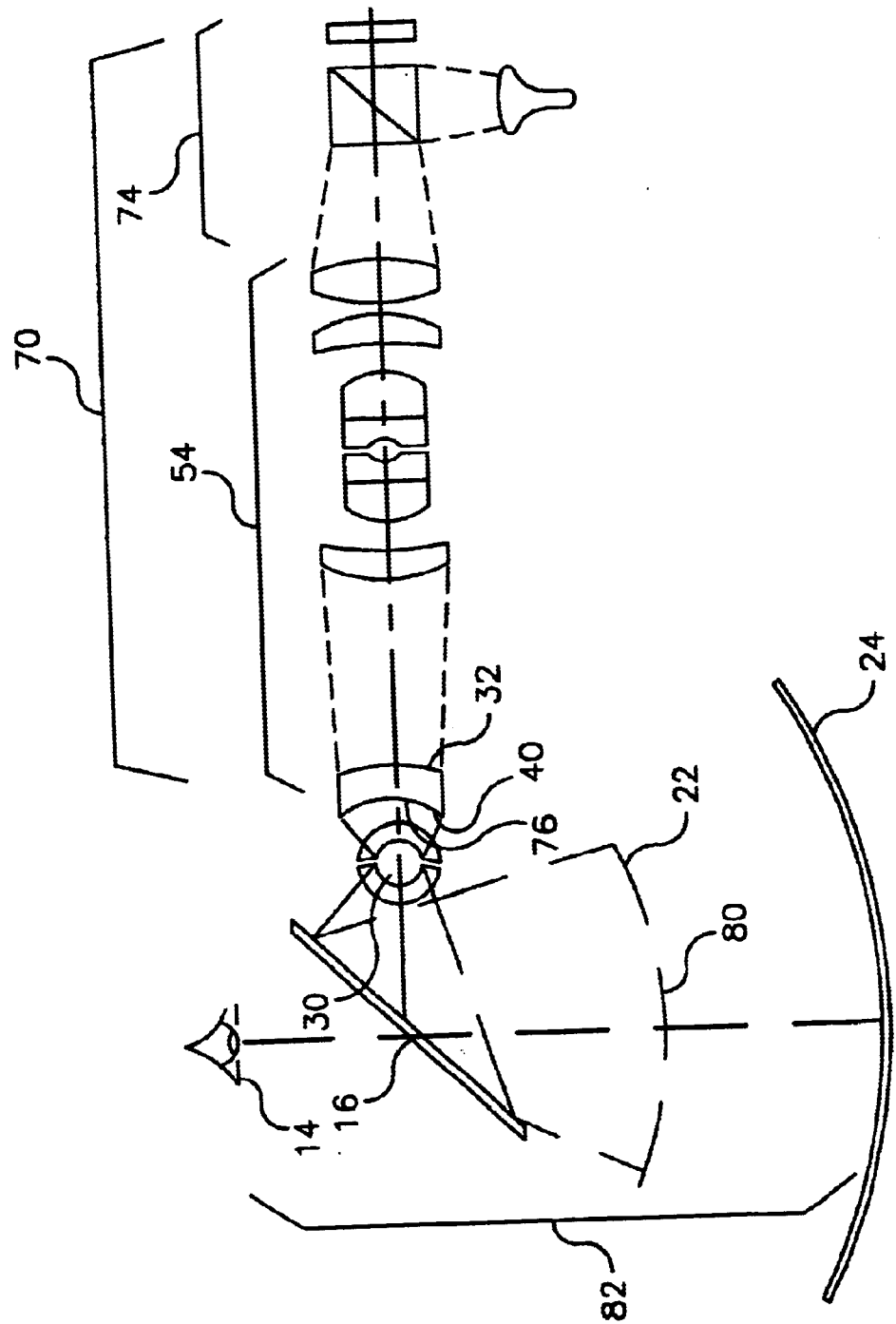
FIG. 2 shows a detailed view of image generation system components for the prior art system of FIG. 1.

Referring to FIG. 2, there is shown, extracted from the more detailed prior art description of the '181 disclosure noted in the background section above, a portion of an image generation system 70 for providing intermediate curved image 80 for projection in a stereoscopic projection system 82 for one viewing pupil 14. Here, an image generator 74 provides a source image from a flat surface, such as from a reflective LCD. A relay lens 54 directs light from image generator 74 onto a diffusing element 32, so that a curved intermediate image 76 is formed on a diffusive surface 40. Ball lens assembly 30, cooperating with beamsplitter 16, projects curved intermediate image 76 toward a front focal surface 22 of curved mirror 24 to form intermediate curved image 80. Curved mirror 24 then provides a virtual image of intermediate curved image 80 for a viewing pupil 14.

Forming a Curved Intermediate Image

Figure 3:
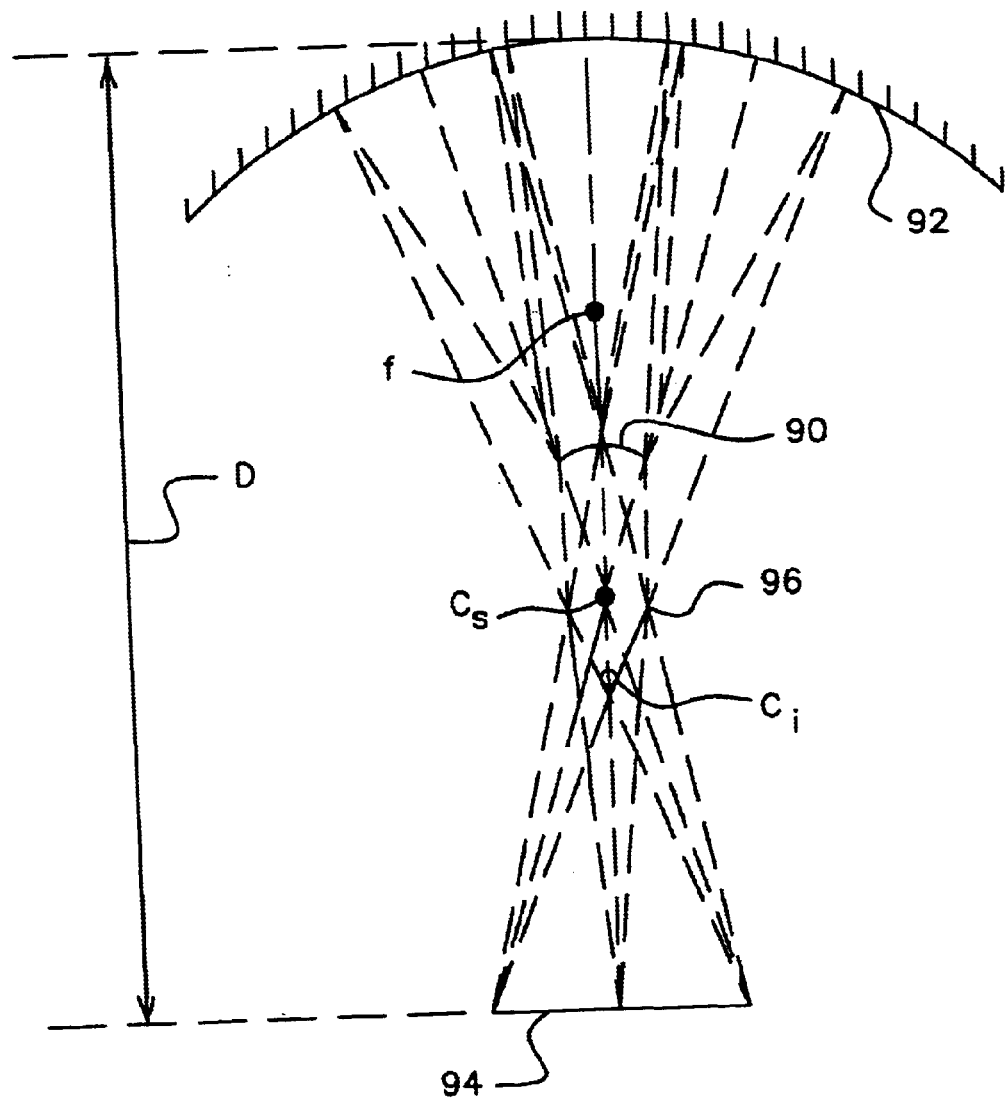
FIG. 3 is a schematic diagram showing how an intermediate image is formed in the apparatus of the present invention.

To eliminate the need for diffusing element 32 as was required using the approach of the '181 disclosure, the present invention provides an alternate method for forming a curved intermediate image using a specular optical system. Referring to FIG. 3, an intermediate image 90 is formed by a curved mirror 92, which is generally spherical according to the present invention. Image-bearing light from image source 94 is directed toward curved mirror 92 through an aperture stop location 96, which defines the angle of light from image source 94 available for forming intermediate image 90. Aperture stop location 96 is at the center of curvature $C_s$ of curved mirror 92. With aperture stop location 96 centered at mirror center of curvature $C_s$, the central rays that pass through $C_s$ are reflected back toward this same point. As the traced light rays of FIG. 3 show, curved intermediate image 90 is typically formed between mirror center of curvature $C_s$ and the mirror focal point f. Curved intermediate image 90 has an image center of curvature $C_i$ that is in a different location from mirror center of curvature $C_s$. As the distance D between image source 94 and curved mirror 92 increases, the respective centers of curvature $C_i$ and $C_s$ move toward each other, coinciding as distance D approaches infinity. At this idealized infinite distance D between image source 94 and curved mirror 92, curved intermediate image 90 would lie on focal point f and the center of curvature of the image $C_i$ would coincide with the center of curvature $C_s$ of curved mirror 24 (FIG. 1).

Using the overall arrangement of FIG. 3, image source 94 can be any of a number of image sources that emit light, such as a display LCD, a CRT, or an OLED or PLED device, for example. Two characteristics of image source 94 are particularly significant with this arrangement:

(i) The image formed on image source 94 is substantially flat. There may be some slight curvature to this image, such as would be provided by a CRT; however, the arrangement of FIG. 3 works well when image source 94 is flat and shows how intermediate image 90 is formed having a curvature using the methods of the present invention. Since most image display devices form a flat image, there is, then, no need for modification to off-the-shelf display components with this arrangement.

(ii) Image source 94 can be several inches in diameter, and may be well over one foot in diameter. In a preferred embodiment, image source 94 is a large LCD display, such as a 17-inch display, for example. This is unlike other apparatus for forming a curved intermediate image, such as was shown with reference to FIG. 2, for which a microdisplay, such as a liquid crystal on silicon (LCOS) or DMD component, is used. Use of a larger display device for image source 94 has particular advantages for increasing both image resolution and brightness.

As described with reference to the Lagrange invariant in the background section above, brightness in an optical system is a product of the emissive area and the solid angle. By allowing image source 94 to have a large emissive area, the method of the present invention allows substantial brightness levels while, at the same time, allowing light angles to be relatively small. Small light angles are advantageous for maximizing image contrast and minimizing color shifting and other related image aberrations.

Separate image sources 94 are used for left and right eyes, respectively. Ideally, image source 94 for left image generation system 70*l* and image source 94 for right image generation system 70*r* are well-matched for image size and color. CRT displays, however, may be at a disadvantage if used as image sources 94. Color differences between CRTs may degrade stereoscopic imaging performance. Additionally, as a result of display ageing, CRT image areas may vary dimensionally, effectively causing left/right pixel misalignment. In contrast to CRT displays, LCD displays offer dimensional stability with stable pixel locations, ease of alignment, and simpler mounting.

Ideal Ball Lens Operation

Figure 4A:
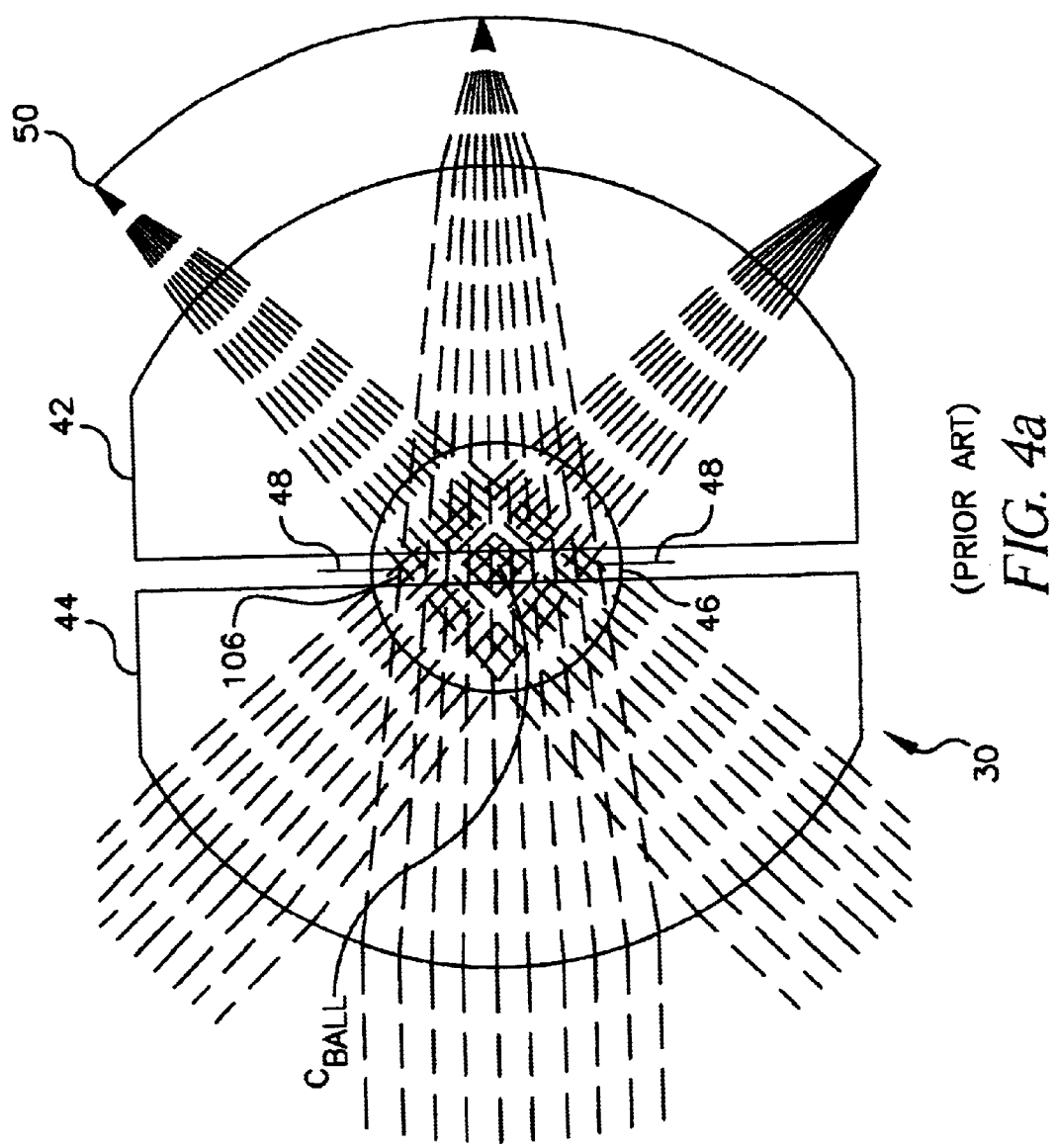
FIG. 4a is a schematic diagram showing optical behavior of a ball lens.

Referring to FIG. 4*a*, there is shown the concentric arrangement and optical characteristics of ball lens assembly 30 for directing light from a curved image 50. A central spherical lens 46 is disposed between meniscus lenses 42 and 44. Spherical lens 46 and meniscus lenses 42 and 44 have indices of refraction and dispersion characteristics intended to minimize on-axis spherical and chromatic aberration, as is well known in the optical design arts. An aperture stop 48 defines a pupil 106 within ball lens assembly 30. Aperture stop 48 need not be a physical stop, but may alternately be implemented using optical effects such as total internal reflection. In terms of the optics path, aperture stop 48 serves to define an entrance pupil and an exit pupil for ball lens assembly 30.

In a preferred embodiment, meniscus lenses 42 and 44 are selected to reduce image aberration and to optimize image quality for the projected image projected. It must be noted that ball lens assembly 30 could comprise any number of arrangements of support lenses surrounding central spherical lens 46. Surfaces of these support lenses, however many are employed, would share a common center of curvature with $C_{ball}$, the center of curvature of central spherical lens 46. Moreover, the refractive materials used for lens components of ball lens assembly 30 could be varied, within the scope of the present invention. For example, in addition to standard glass lenses, central spherical lens 46 could comprise a plastic, an oil or other liquid substance, or any other refractive material chosen for the requirements of the application. Meniscus lenses 42 and 44, and any other additional support lenses in ball lens assembly 30, could be made of glass, plastic, enclosed liquids, or other suitable refractive materials, all within the scope of the present invention. In its simplest embodiment, ball lens assembly 30 could simply comprise a single spherical lens 46, without additional supporting refractive components.

In ideal operation, curved image 50 shares the same center of curvature $C_{ball}$ as ball lens assembly 30. When arranged in this fashion, light from curved image 50 is imaged with low levels of aberration, as is represented in the light rays of FIG. 4a.

Figure 4B:
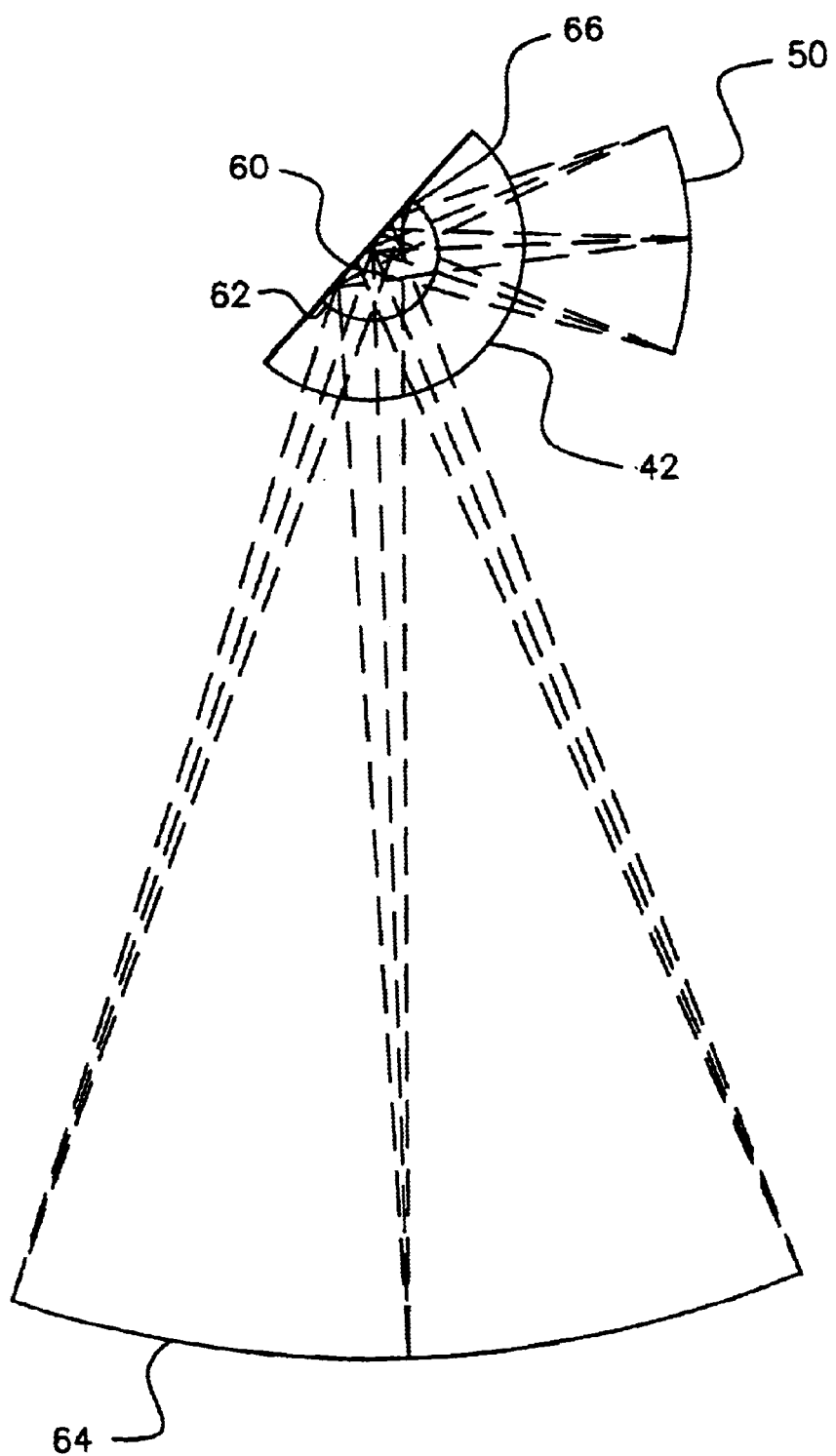
FIG. 4b is a schematic diagram showing optical behavior of an hemispheric lens with a reflective surface.

The inherent advantages of a ball lens can be exploited using a modified design, such as using a hemisphere combined with a folding mirror, as is shown in the cross-sectional ray diagram of FIG. 4b. In FIG. 4b, a hemispheric lens assembly 60 comprises at least a hemispheric central lens 66 and a reflective surface 62 along the meridional plane of the hemisphere. Optionally, one or more meniscus lenses 42 could also be part of hemispheric lens assembly 60. Reflective surface 62 may be formed over the full surface of the meridional plane or may be formed only along a portion of this surface. As shown in FIG. 4b, hemispheric lens assembly 60 forms, from curved image 50 as its object, a curved image 64, folding the optical path at the same time. This arrangement can have advantages, for example, where space for optical components is at a premium.

For the purposes of this disclosure, the term "ball lens segment" comprises both fully spherical ball lens assembly 30, as shown in FIG. 4a and hemispheric lens assembly 60 as shown in FIG. 4b.

First Embodiment of Image Generation System

Figure 5:
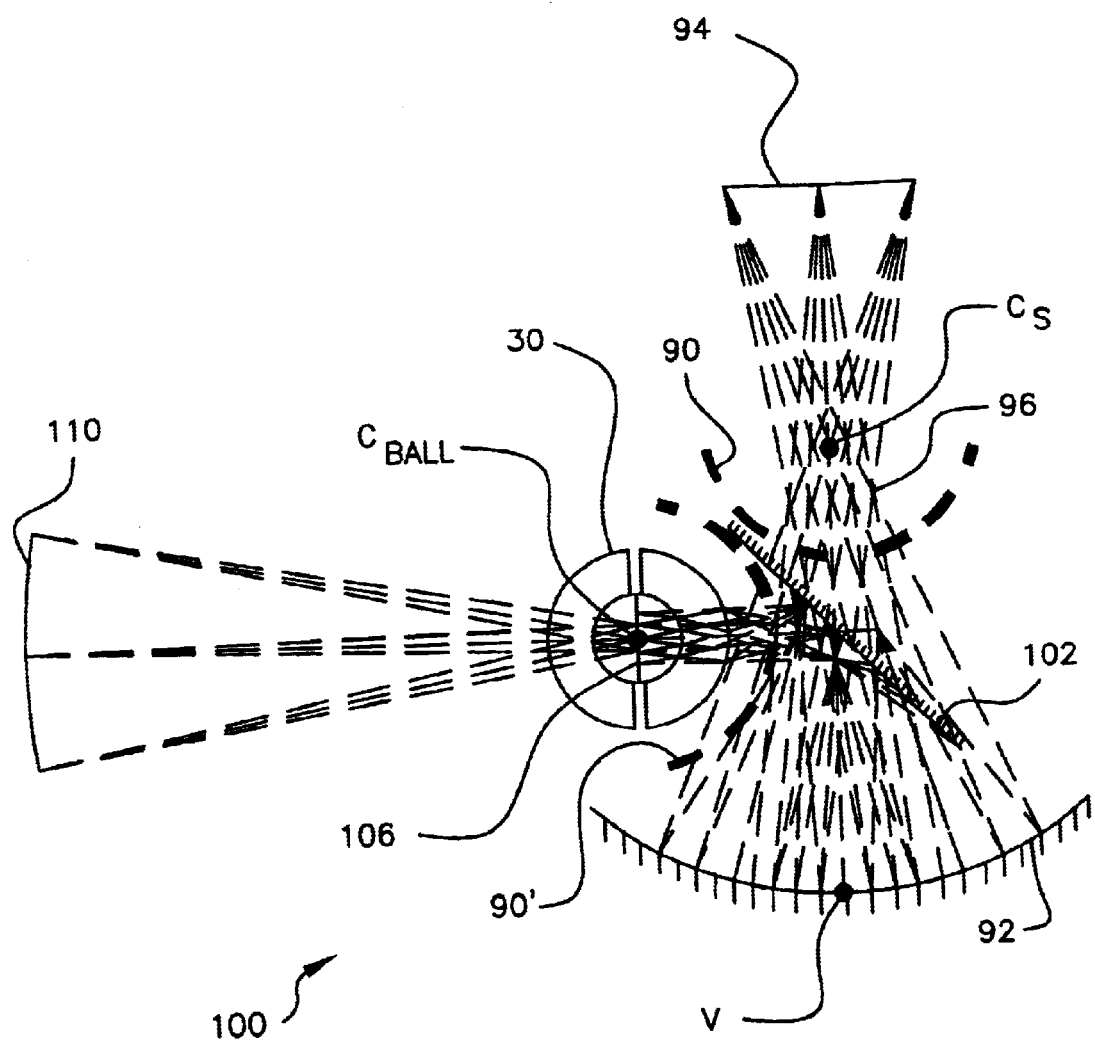
FIG. 5 is a schematic diagram showing an apparatus for forming a curved intermediate image according to the present invention.

Referring to FIG. 5, there is shown a first embodiment of an image generation system 100 for forming a curved image 110 for projection according to the present invention, as disclosed in the commonly-assigned copending U.S. patent application Ser. No. 10/393,236. Curved image 110 serves the function of intermediate curved image 80 shown in FIGS. 1 and 2. As described with reference to FIG. 3, image source 94 provides image-bearing light to curved mirror 92 through aperture stop location 96. Referring now to FIG. 5, a beamsplitter 102 is used to direct an intermediate image 90' so that it is concentric to ball lens assembly 30, which could alternately be embodied as hemispheric lens assembly 60, as was shown in FIG. 4b. Because the light is being directed by curved mirror 92 toward its center of curvature $C_s$, rather than towards the center of curvature $C_{ball}$ of ball lens assembly 30, some portion of the light does not enter the pupil 106 of ball lens assembly 30, thus causing vignetting. Overfilling pupil 106 of ball lens assembly 30 compensates for vignetting. Ball lens assembly 30 re-images intermediate curved image 90' to form curved image 110. Beamsplitter 102 is disposed between the vertex V of curved mirror 92 and its center of curvature $C_s$ as shown in FIG. 5.

It must be emphasized that curved mirror 92 serves as an image generation component that serves image generation system 100 for forming intermediate curved image 110, as shown in FIGS. 3 and 5. This is to be distinguished from ball lens imaging curved mirror 24 (used later in the optical path, as shown in FIG. 1 and in subsequent figures) which, in conjunction with beamsplitter 16, provides pupil imaging and forms the final virtual image observed by viewer 12. Similarly, beamsplitter 102 serves image generation system 100 for forming curved image 110 and is to be distinguished from beamsplitter 16 (shown in FIG. 1 and in subsequent figures) which cooperates with curved mirror 24 to provide pupil imaging and form the virtual image.

Second Embodiment of Image Generation System

Figure 6:
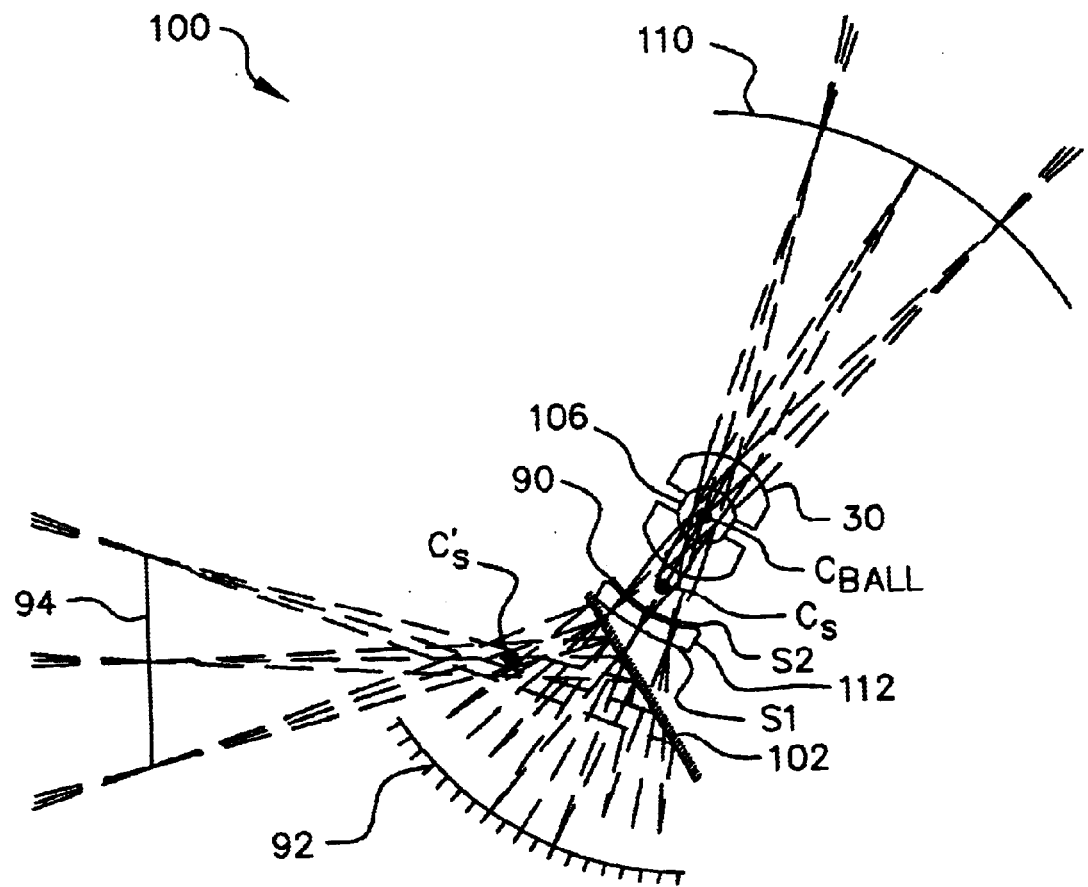
FIG. 6 is a schematic diagram showing an alternate embodiment of the present invention for forming a curved image, using a field lens.

Referring to FIG. 6, there is shown an improved embodiment of image generation system 100 in which a field lens 112 is positioned along the output axis where intermediate image 90 is formed. By positioning field lens 112 at this location, intermediate image 90 is not substantially changed; however, light from intermediate image 90 is directed toward center of curvature $C_{ball}$ of ball lens assembly 30. Once again, it is significant to observe that ball lens assembly 30 shares the same center of curvature $C_{ball}$ as intermediate image 90, but that this is not identical to the center of curvature $C_s$ of curved mirror 92 or to the imaged center of curvature $C_s'$, towards which light from curved mirror 92 is directed. The function of field lens 112 is, then, to image $C_s$ onto $C_{ball}$ without substantially affecting the image quality of intermediate image 90. By doing this, field lens 112 essentially redirects light in order to fill pupil 106 of ball lens assembly 30 without vignetting.

Common to telescopic, microscopic, and similar "tube" optical systems, field lenses are widely employed in the optical arts, placed at the image location of a first lens, where the image formed at that image location becomes the object of a second lens. In this way, field lens 112 improves the overall brightness and field of view of the optical system. Background information on field lens use and theory can be found, for example, in *Modern Optical Engineering, the Design of Optical Systems*, by Warren J. Smith, McGraw-Hill, NY, pp. 212–213 and in other textbooks known in the optics field.

In one embodiment, surface S1 of field lens 112 is concentric with mirror center of curvature $C_s$ and therefore does not deviate chief rays towards $C_{ball}$. In such an embodiment, surface S2, not concentric with mirror center of curvature $C_s$, operates to bend chief rays toward $C_{ball}$. Alternately, surface S2 could be concentric with mirror center of curvature $C_s$, surface S1 performing the operation of bending chief rays toward $C_{ball}$. Embodiments with either surface S1 or S2 concentric with $C_s$ or $C_{ball}$ represent the most straightforward approaches to the design of field lens 112; other designs could have neither surface S1 nor S2 concentric with mirror center of curvature $C_s$ or $C_{ball}$, however, these designs could be more complex.

Figure 7A:
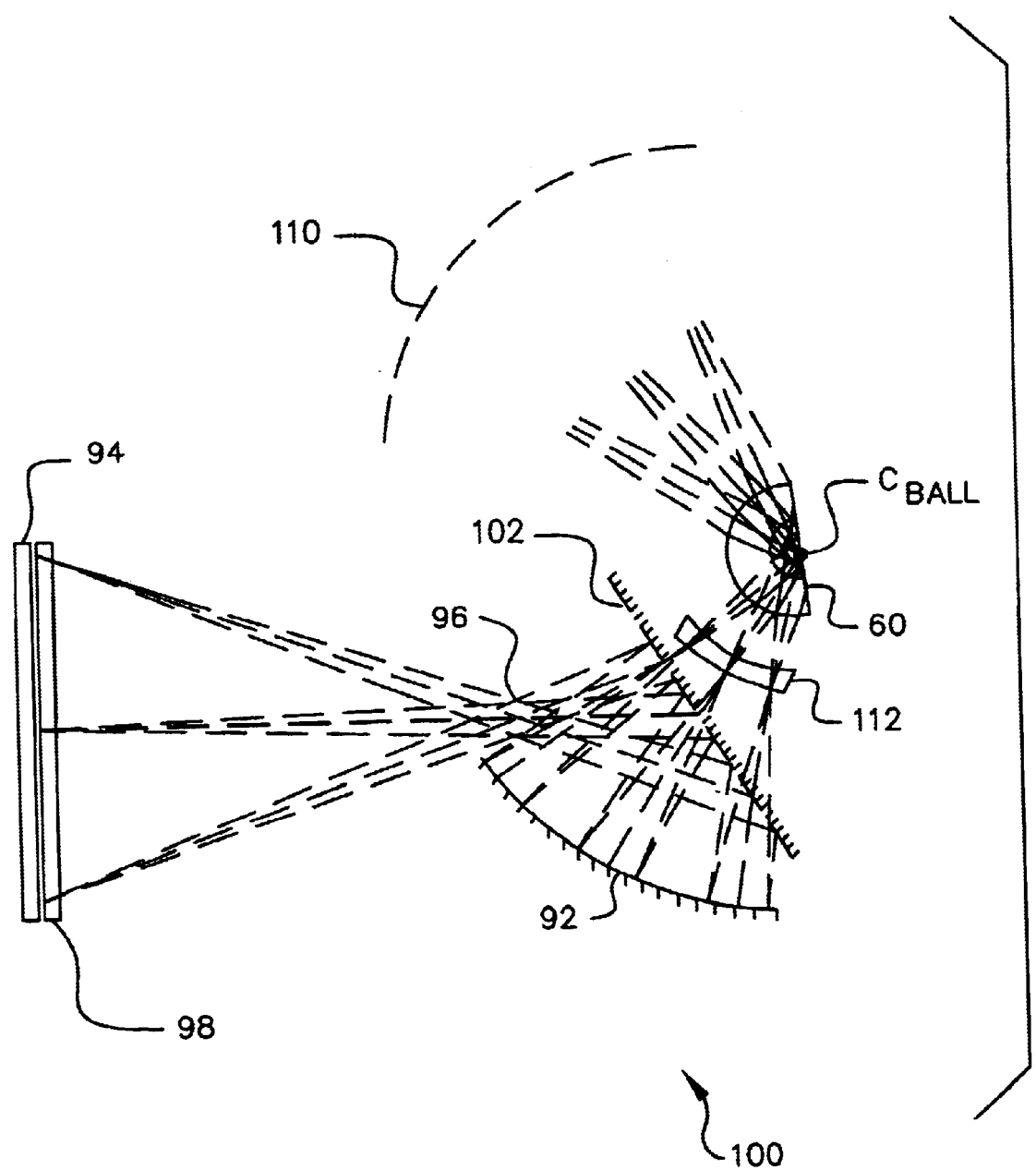
FIG. 7a is a schematic diagram showing an alternate embodiment of the present invention for forming a curved intermediate image using a focusing optical element, using a conventional thin beamsplitter.

As was noted above with reference to FIG. 4b, the use of hemispheric ball lens assembly 60 may have advantages for simplifying the optical path. Referring to FIG. 7a, there is shown an alternative arrangement to that of FIG. 6, using hemispheric ball lens assembly 60 with field lens 112. In the arrangement of FIG. 7a, field lens 112 again operates to image $C_s$ onto $C_{ball}$, where $C_{ball}$ is optically the center of curvature of hemispheric ball lens assembly 60.

Providing Advantages of Telecentric Light

Figure 8:
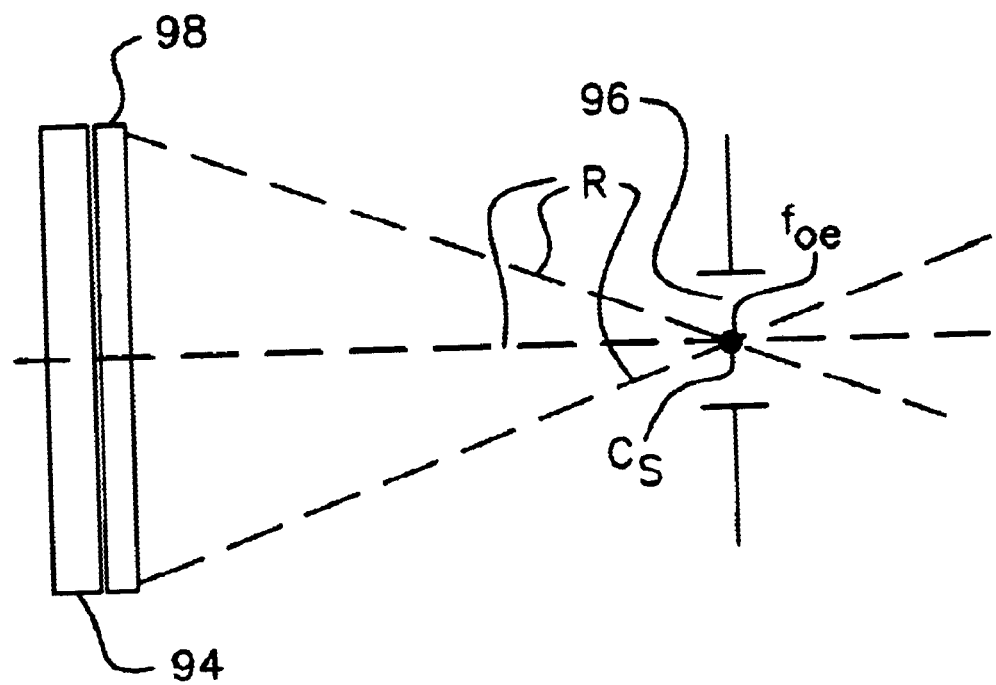
FIG. 8 is a schematic diagram showing the overall function of the focusing optical element of FIGS. 7a and 7b in the imaging path.

Still referring to FIG. 7a, an optional focusing optical element 98 is employed for providing improved, uniform brightness across the field. Disposed against the surface of image source 94, or very near this surface, focusing optical element 98 acts as a type of field lens for directing light emitted from image source 94. Referring to FIG. 8, there is shown, in schematic form, the function of focusing optical element 98, focusing the emitted light from image source 94 to its focal point $f_{oe}$, coincident with mirror center of curvature $C_s$. By doing this, focusing optical element 98 forces telecentricity for light emitted from image source 94, thereby optimizing the brightness and contrast of the image provided to the optical system through aperture stop location 96. As a result, curved image 110 has optimum brightness across the field. In one embodiment, focusing optical element 98 is a Fresnel lens. Among other devices that could be employed as focusing optical element 98 are holographic optical elements, diffraction optical elements, two-cylinder Fresnel lenses, or even a more conventional curved surface lens, for example.

Considerations for Beamsplitter 102

As is shown in FIGS. 5 and 6, beamsplitter 102 must accept incident light over a range of angles, so that where beamsplitter 102 is made of glass, rays at extreme sides of the field effectively encounter different thicknesses of glass. For this reason, it can be seen that there are advantages to providing beamsplitter 102 having minimal thickness of glass or plastic. Thus, beamsplitter 102 may be a thin glass or thin plastic type or a pellicle type beamsplitting device.

Figure 7B:
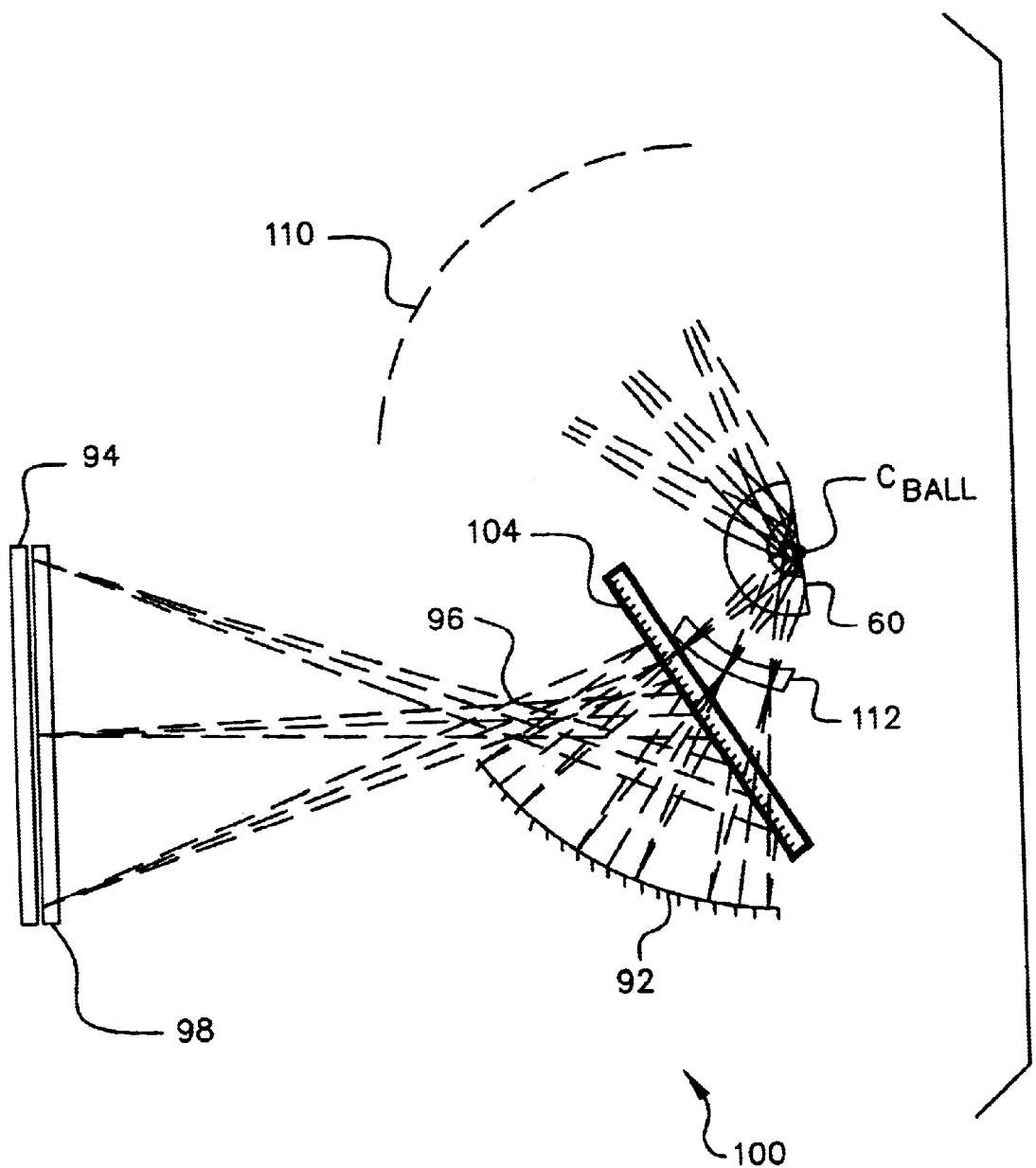
FIG. 7b is a schematic diagram showing an alternate embodiment of the present invention for forming a curved intermediate image using a focusing optical element and employing a wedge beamsplitter.

Referring to FIG. 7b, a wedge beamsplitter 104 can be used as an alternative. Wedge beamsplitter 104 has substrate thickness varied so that the cross-sectional profile of wedge beamsplitter 104 is wedge-shaped. The difference in substrate thickness of wedge beamsplitter 104 provides an alternative solution that helps to compensate for optical path length and angle differences across its surface. The use of wedge beamsplitter 104 within image generation system 100 has advantages, since its thicker substrate is mechanically less fragile than a pellicle or thin beamsplitter 102.

Embodiment for Stereoscopic Viewing

Figure 9:
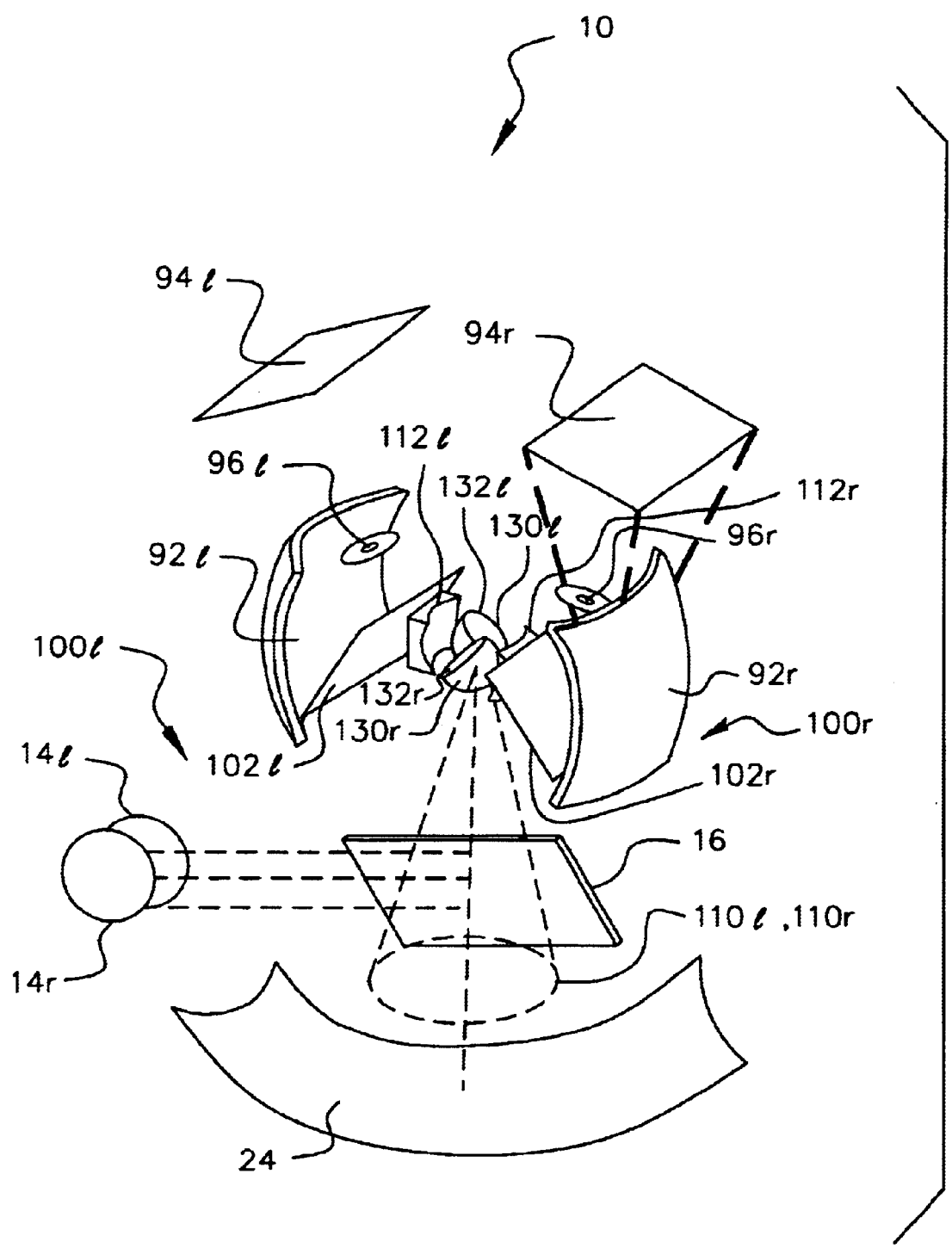
FIG. 9 is a perspective view showing an arrangement of components for pupil imaging in an autostereoscopic display system of the present invention.

Referring to FIG. 9, there is shown a perspective view of a left and a right eye image generation system 100l and 100r within autostereoscopic display apparatus 10. The task of generating a curved image to be displayed to each eye uses the basic components of FIGS. 6, 7a and 7b. Left and right image sources 94l and 94r provide, through respective left and right aperture stop locations 96l and 96r and reflected from left and right beamsplitters 102l and 102r, light from images to their respective left and right curved mirrors 92l and 92r. Respective left and right curved intermediate images, through respective left and right beamsplitters 102l and 102r, are formed near their respective left and right field lenses 112l and 112r, which redirect light to their respective left and right ball lens segments 130l and 130r. Left and right ball lens segments 130l and 130r are basically hemispheric in the configuration of FIG. 9, similar to hemispheric lens assembly 60 as shown in FIG. 4b. Left and right ball lens segments 130l and 130r are provided with left and right reflective surfaces 132l and 132r and perform the dual function of folding the light path and projecting the intermediate images towards curved mirror 24. With the arrangement of FIG. 9, each image generation system 100l and 100r can produce the appropriate image intended for left and right viewing pupils 14l and 14r. Curved images generated by left and a right eye image generation systems 100l and 100r form left and right intermediate curved images 110l and 110r for collimation using large curved mirror 24 to provide, by cooperation with beamsplitter 16, virtual images at left and right viewing pupils 14l and 14r, in the same manner as is disclosed in U.S. Pat. No. 6,416,181. Referring back to FIG. 1, curved image 110 of FIG. 7a or 7b corresponds to intermediate curved image 80 in FIG. 1, for example.

Alternate Embodiment for Stereoscopic Viewing, Using Left and Right Mirrors

Figure 16:
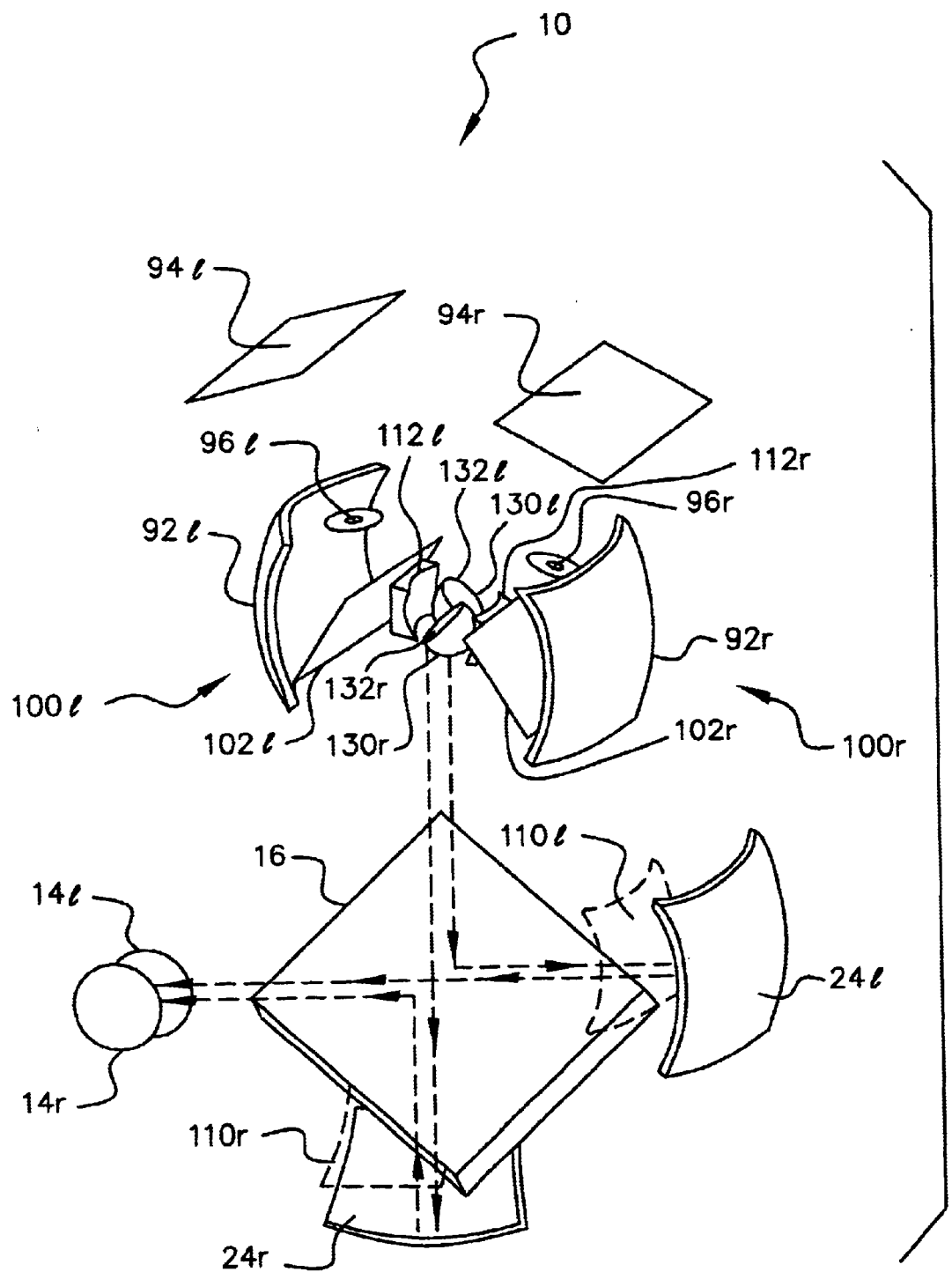
FIG. 16 is a perspective view showing an arrangement of components for pupil imaging in an alternate embodiment of the present invention, using separate mirrors for left and right pupils.

The embodiment of FIG. 9 showed the use of a single curved mirror 24 with beamsplitter 16 for forming both left and right virtual images. In the alternate embodiment of FIG. 16, there is shown how autostereoscopic display apparatus 10, using the same left and a right eye image generation systems 100l and 100r described with respect to FIG. 9, can employ separate left and a right curved mirrors, 24l and 24r, one for each corresponding viewing pupil 141 and 14r. The alternate arrangement of FIG. 16 is advantaged over the arrangement of FIG. 9 that uses a single curved mirror 24 because each left and right ball lens segment 130l and 130r can be positioned on-axis with respect to its corresponding curved mirror 24l, 24r. In the arrangement of FIG. 9, on the other hand, left and right ball lens segments 130l and 130r are offset slightly to either side of the optical axis of single curved mirror 24. This causes a slight keystoning aberration in each optical path. Disadvantageously, keystoning effects for left and right images are in opposite directions, degrading the quality of the displayed image at extreme edges of the field. To some extent, this effect can be corrected or mitigated electronically, by pre-distorting the image data.

Designs using left and right curved mirrors 24l and 24r, such as shown in FIG. 16 allow on-axis imaging, minimizing or eliminating keystoning effects. However, designs using multiple mirrors can be disadvantaged due to mechanical placement constraints; it is difficult to arrange both left and right curved mirrors 24l and 24r and beamsplitter 16 without some obstruction and consequent reduction of field width. Another design consideration relates to the relative positioning of left and right ball lens segments 130l and 130r. Using dual curved mirrors 24l and 24r, positioning constraints for both left and right ball lens segments 130l and 130r can be relaxed somewhat, easing space requirements for imaging support components and allowing the size of ball lens segment 130 components to be relatively larger, providing a larger viewing pupil 14. By contrast, the embodiment of FIG. 9 requires that ball lens segments 130l and 130r be positioned closely together, but allows a more compact design at the same time.

The same general principles used for forming a virtual image with the prior art configuration of FIG. 1 and the configuration of FIG. 9 also apply to the dual mirror configuration of FIG. 16, with necessary modifications for separate left and right image paths, as would be appreciated by those skilled in the imaging arts. For example, left and right intermediate curved images 110l and 110r are formed at focal surfaces of left and right curved mirrors respectively in order to provide virtual imaging.

Correcting for Spherical Aberration

Figure 10:
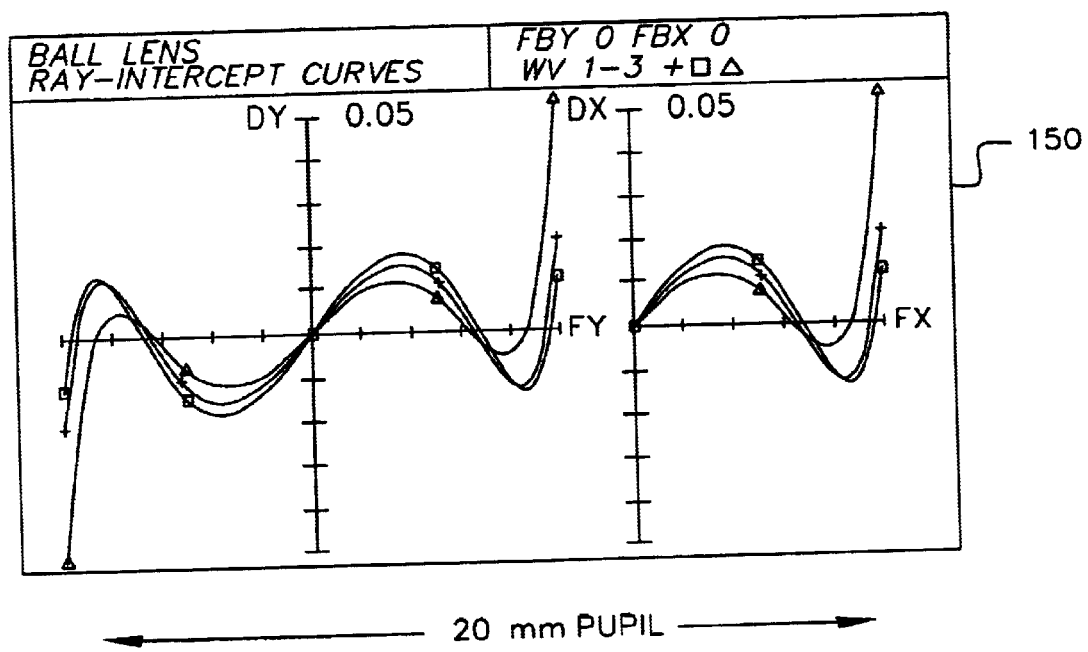
FIG. 10 shows corrected aberration curves for the ball lens assembly of the apparatus of the present invention.

As was described with reference to FIG. 4a, ball lens assembly 30 unavoidably exhibits some amount of aberration, which is largely corrected using central lens 46 in combination with meniscus lenses 42 and 44. Referring to FIG. 10, there is shown, for ball lens assembly 30 of a preferred embodiment, tangential and sagittal aberration curves 150 for a 20 mm pupil, showing a significant amount of correction.

However, as a result of residual spherical aberration due to higher order aberrations, the size of viewing pupils 14l, 14r is still somewhat limited. Due to this residual aberration, movement of the eyes of observer 12 within viewing pupils 14l, 14r can cause some amount of image "swim".

Spherical aberration is a recognized problem in optical systems that employ a concave mirror, such as astronomical telescopes for example. To compensate for this type of aberration, the Schmidt optical system, as described in *Modern Optical Engineering, the Design of Optical Systems*, by Warren J. Smith (cited above), pp. 393–394, employs an aspheric corrector plate. In the Schmidt system, a thin, aspheric corrector plate is positioned at the center of curvature of the curved mirror.

Figure 11:
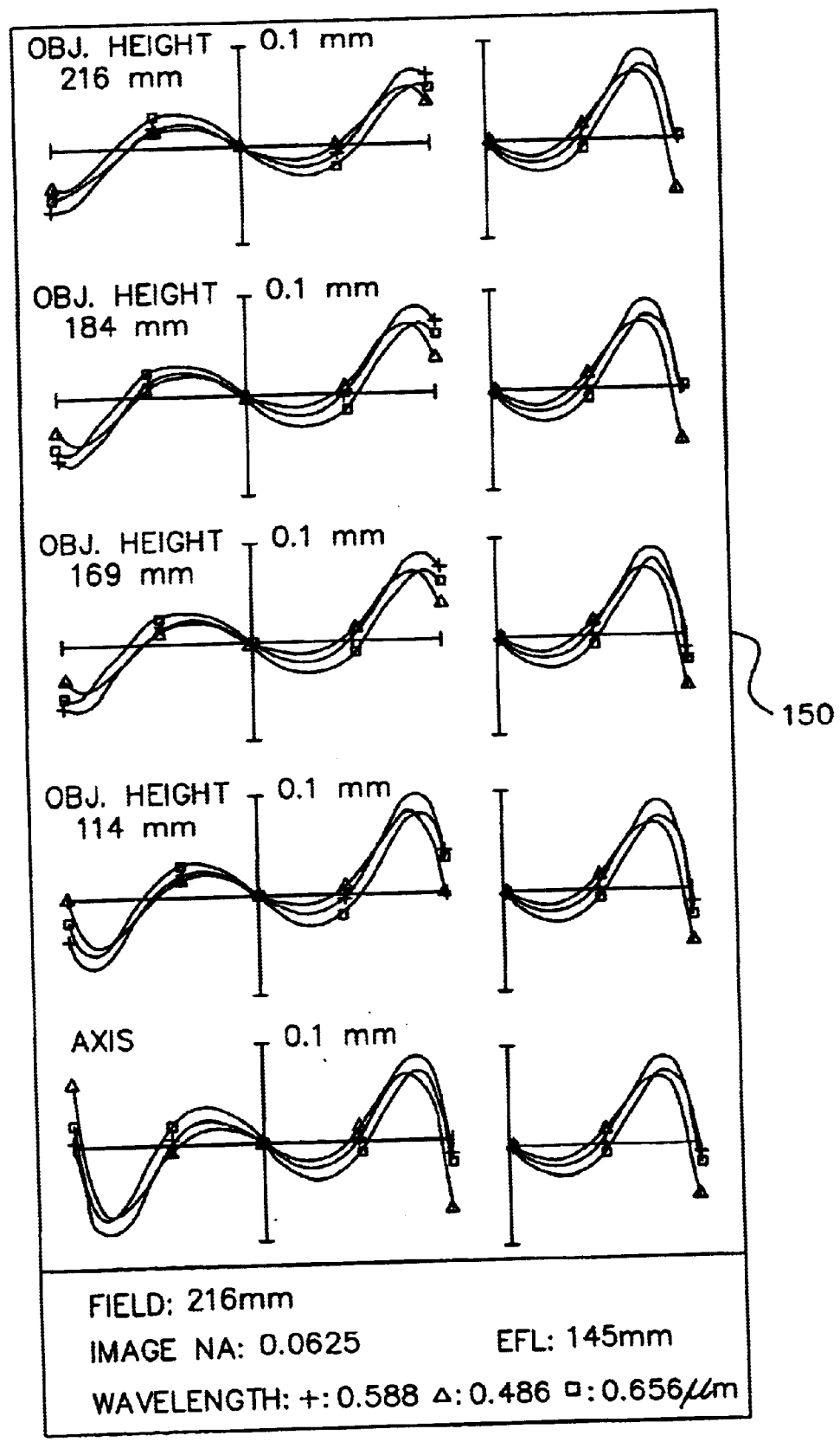
FIG. 11 shows uncorrected aberration curves for the curved image generating optical system of the apparatus of the present invention.
Figure 12:
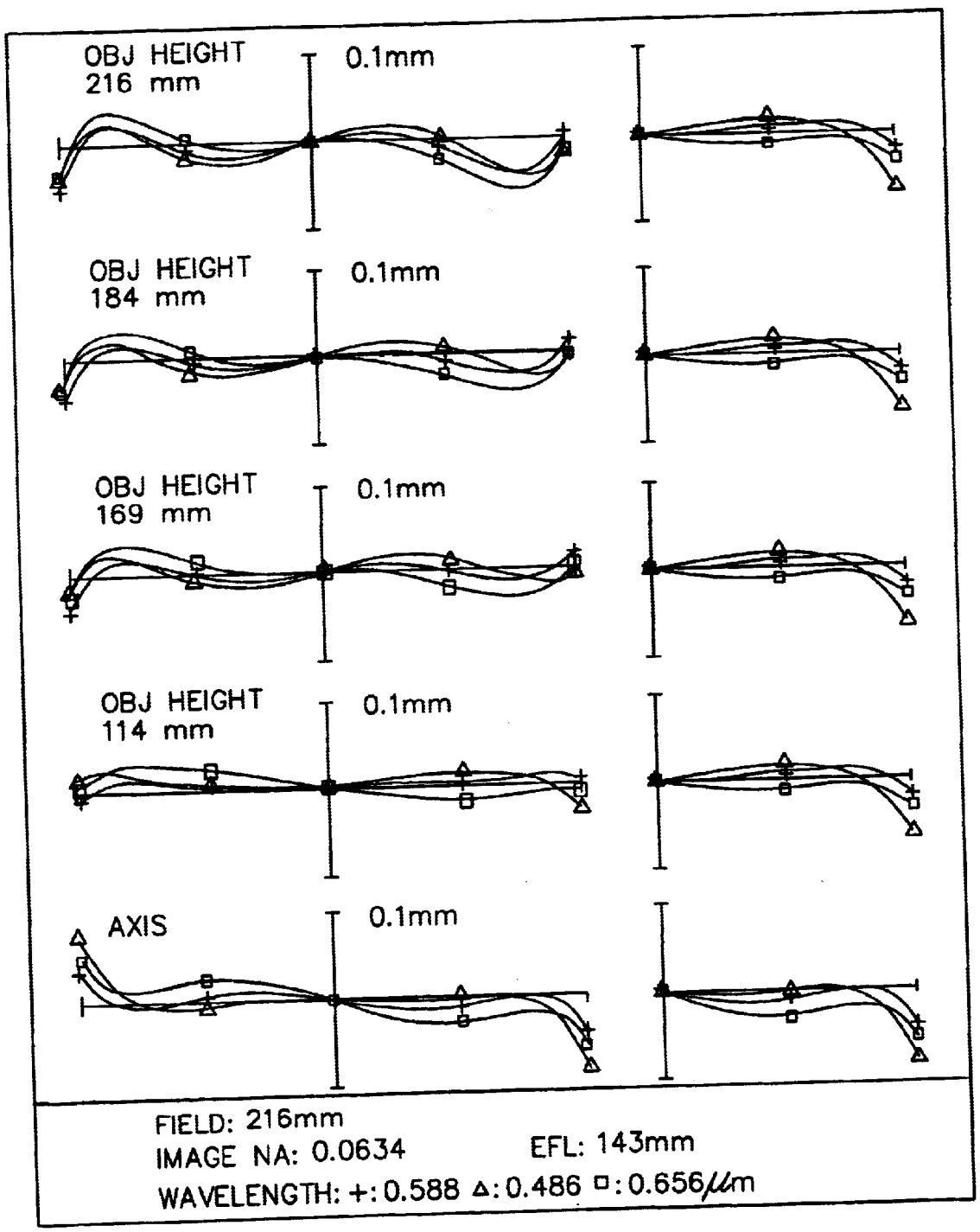
FIG. 12 shows corrected aberration curves for the curved image generating optical system of the apparatus of the present invention.

Comparing aberration curves 150 in FIG. 11 and FIG. 12, the improvement using the Schmidt solution can be readily seen, for similar imaging conditions and a 32 mm pupil. FIG. 11 corresponds to the optical arrangement of FIG. 6, where there is no correction for spherical aberration due to residual higher order aberrations. FIG. 12 corresponds to the optical arrangement of FIG. 13.

Figure 13:
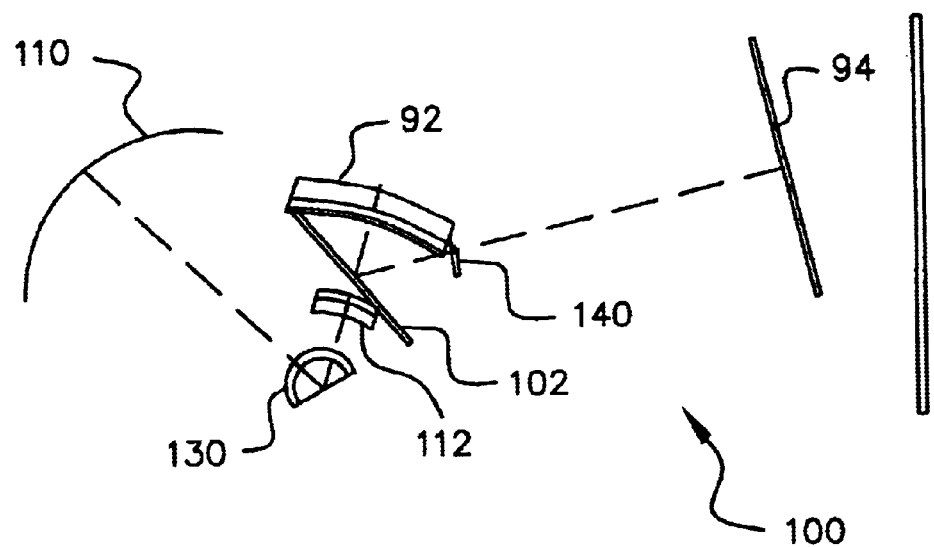
FIG. 13 shows a simplified image path using an aspheric corrector element.

FIG. 13 shows a side view of a simplified optical path for image generation system 100 using an aspheric corrector element 140 disposed near the center of curvature of curved mirror 92. Light from image source 94 is directed through aspheric corrector element 140, which is optically conjugate to the center of curvature of curved mirror 92. The curved intermediate image formed by curved mirror 92 lies near field lens 112, which directs the light to a ball lens segment 130. Ball lens segment 130 creates curved image 110 for curved mirror 24 (not shown in FIG. 13).

Figure 15:
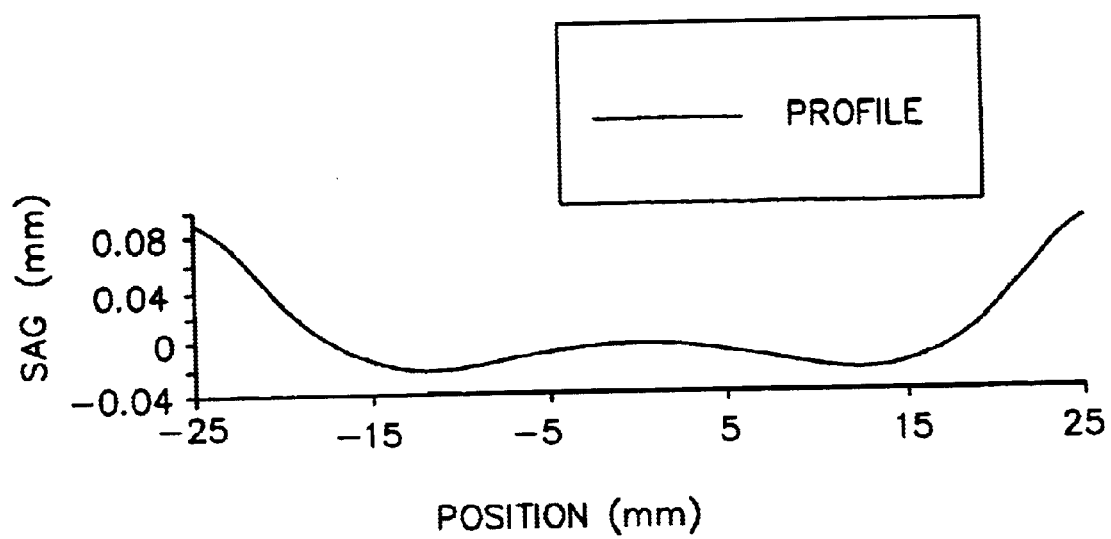
FIG. 15 shows the sag profile for an aspheric surface providing the improvement depicted in FIG. 14.
Figure 14:
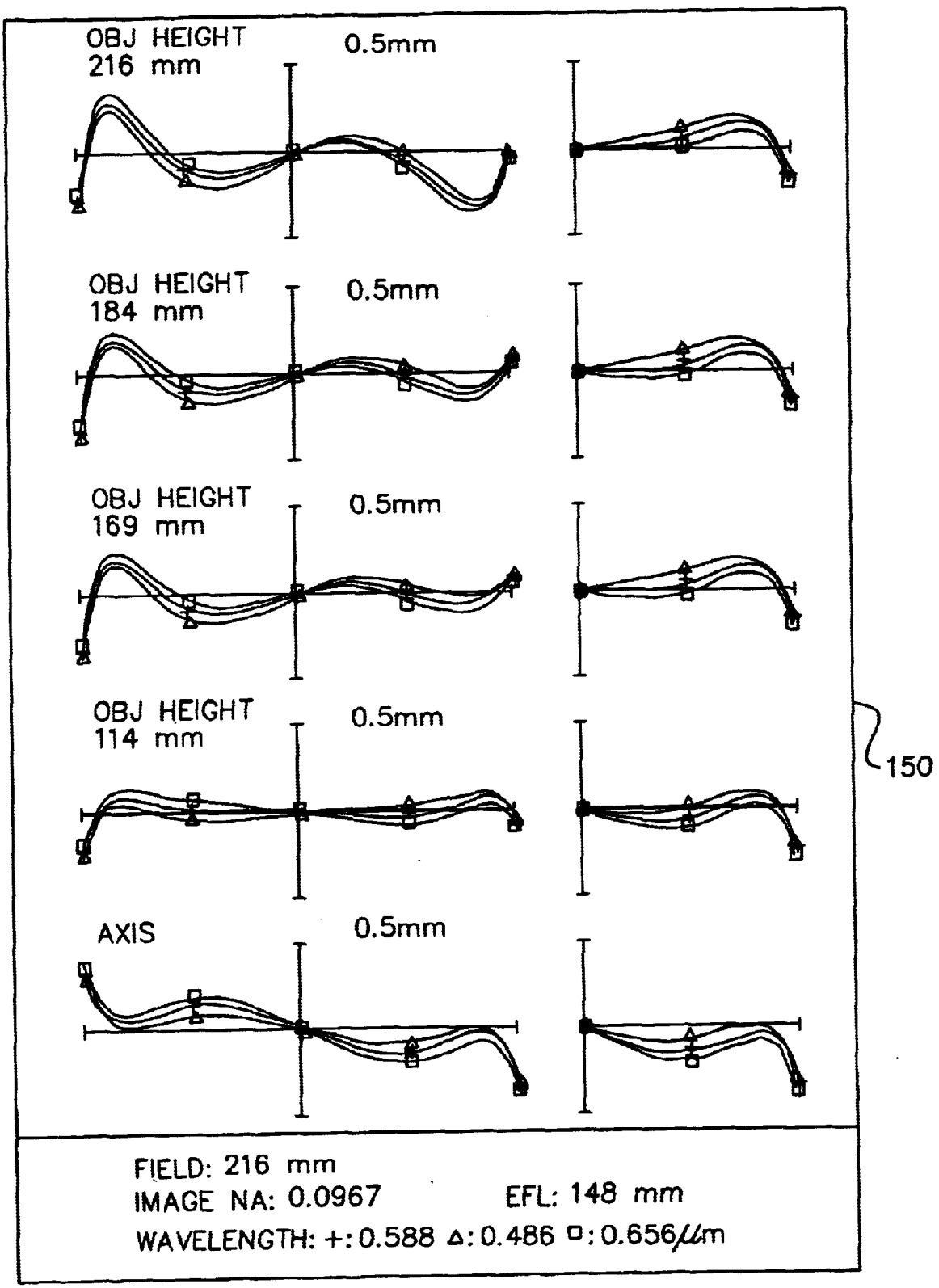
FIG. 14 shows corrected aberration curves using an aspheric corrector element to obtain a larger viewing pupil.

Placing aspheric corrector element 140 near the center of curvature of curved mirror 92 effectively images aspheric corrector element 140 into the pupil of ball lens segment 130; that is, corrector element 104 and the pupil of ball lens segment 130 are optically conjugate. This allows aspheric corrector element 140 to provide effective correction across the full field of view. As a result, pupil size can be increased to 50 mm, with minimal aberration, as shown in aberration curve 150 of FIG. 14. By way of example, FIG. 15 shows the sag that is required of the aspheric surface for a corrector plate as aspheric corrector element 140 in a preferred embodiment.

In an alternate embodiment, aspheric corrector element 140 could be a compound lens that corrects chromatic as well as spherical aberration. Such an arrangement would require more complexity than the design of a single-component aspheric corrector element 140, but would simplify the design requirements of ball lens segment 130. For example, where a compound lens is used for aspheric corrector element 140, it may be possible to use only a single element as ball lens segment 130.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, field lens 112 can be more complex than is shown here, having different curvature, composition, or coatings. Image source 94, a transmissive LCD device in one embodiment, can be any of a number of types of image source, including film, CRT, LCD, and digital imaging devices. Image source 94 could be an emissive array, such as an organic light emitting diode (OLED) array, for example. In order to take advantage of the benefits of monocentric imaging, curved mirror 92 will be substantially spherical in most embodiments; however, some slight shape modifications might be used, with the corresponding changes to supporting optics and to optional aspheric corrector element 140. Either ball lens assembly 30 or hemispheric lens assembly 60 could serve as the ball lens segment for either or both left and right image generation systems. Separate left and right curved mirrors 24 could be used to improve the image quality of each viewing pupil 14*l*, 14*r*, reducing undesirable "keystoning" effects that can result from off off-axis positioning of left and right ball lens segments 130*l*, 130*r*. Curved mirror 24 could be fabricated as a highly reflective surface using a number of different materials.

Thus, what is provided is an apparatus and method for autostereoscopic image display having improved brightness, pupil size, and resolution.

PARTS LIST 10 autostereoscopic display apparatus
12 viewer
14 viewing pupil
14*l* left viewing pupil
14*r* right viewing pupil
16 beamsplitter
22 front focal surface
24 curved mirror
24*l* curved mirror, left
24*r* curved mirror, right
30 ball lens assembly
30*l* ball lens assembly, left
30*r* ball lens assembly, right
32 diffusing element
40 diffusive surface
42 meniscus lens
44 meniscus lens
46 central spherical lens
48 aperture stop
50 curved image
54 relay lens
60 hemispheric lens assembly
62 reflective surface
64 curved image
66 hemispheric central lens
70 image generation system
70*l* left image generation system
70*r* right image generation system
74 image generator
76 curved intermediate image
80 intermediate curved image
82 stereoscopic projection system
90 intermediate image
90' intermediate image
92 curved mirror
92*l* left curved mirror
92*r* right curved mirror
94 image source
94*l* left image source
94*r* right image source
96 aperture stop location
96*l* left aperture stop location
96*r* right aperture stop location
98 focusing optical element
100 image generation system
100*l* left image generation system
100*r* right image generation system
102 beamsplitter
102*l* left beamsplitter
102*r* right beamsplitter
104 wedge beamsplitter
106 ball lens pupil
110 curved image
110*l* left curved image
110*r* right curved image
112 field lens
112*l* left field lens
112*r* right field lens
130 ball lens segment
130*l* left ball lens segment
130*r* right ball lens segment
132*l* left reflective surface
132*r* right reflective surface
140 aspheric corrector element
150 aberration curve

What is claimed is:

1. An autostereoscopic optical apparatus for viewing a stereoscopic virtual image comprising a left image to be viewed by an observer at a left viewing pupil and a right image to be viewed by the observer at a right viewing pupil, the apparatus comprising:
(a) a left image generation system for forming a left curved intermediate image comprising:
    (i) a left curved mirror having a left mirror center of curvature;
    (ii) a left beamsplitter disposed between a vertex of said left curved mirror and said left mirror center of curvature;
    (iii) a left image source for providing light to said left curved mirror, said left curved mirror cooperating with said left beamsplitter to form a left intermediate image of said left image source, said left intermediate image having a left image center of curvature;
    (iv) a left ball lens segment, centered about said left image center of curvature, for forming said left curved intermediate image from said left intermediate image of said left image source;
(b) a right image generation system for forming a right curved intermediate image comprising:
    (i) a right curved mirror having a right mirror center of curvature;
    (ii) a right beamsplitter disposed between a vertex of said right curved mirror and said right mirror center of curvature;
    (iii) a right image source for providing light to said right curved mirror, said right curved mirror cooperating with said right beamsplitter to form a right intermediate image of said right image source, said right intermediate image having a right image center of curvature;
    (iv) a right ball lens segment, centered about said right image center of curvature, for forming said right curved intermediate image from said right intermediate image of said right image source;
(c) a ball lens imaging curved mirror having a focal surface and having a center of curvature, said center of curvature placed substantially optically midway between said left ball lens segment and said right ball lens segment, wherein said left curved intermediate image from said left image generation system and said right curved intermediate image from said right image generations system lie substantially on said focal surface;
(d) a third beamsplitter disposed between said focal surface and said center of curvature of said ball lens imaging curved mirror, said ball lens imaging curved mirror and said third beamsplitter cooperating to form, at the left viewing pupil:
    (i) a real image of said left ball lens segment; and
    (ii) a virtual image of said left curved intermediate image;
said ball lens imaging curved mirror and said third beamsplitter further cooperating to form, at the right viewing pupil:
    (i) a real image of said right ball lens segment; and
    (ii) a virtual image of said right curved intermediate image.

2. An autostereoscopic optical apparatus according to claim 1 further comprising a left corrector element disposed near the center of curvature of said left curved mirror.

3. An autostereoscopic optical apparatus according to claim 2 wherein said left corrector element comprises an aspheric surface.

4. An autostereoscopic optical apparatus according to claim 2 wherein said left corrector element comprises a compound lens.

5. An autostereoscopic optical apparatus according to claim 1 wherein said left beamsplitter is cross sectionally wedge-shaped.

6. An autostereoscopic optical apparatus according to claim 1 wherein said left beamsplitter is a pellicle.

7. An autostereoscopic optical apparatus according to claim 1 wherein said left image source is taken from the group consisting of a CRT, an emissive array, an LCD display, an OLED.

8. An autostereoscopic optical apparatus according to claim 1 further comprising a field lens disposed between said left mirror center of curvature and the focal point of said left curved mirror for imaging said left mirror center of curvature toward said left image center of curvature.

9. An autostereoscopic optical apparatus according to claim 8 wherein a surface of said field lens is substantially concentric with said left mirror center of curvature.

10. An autostereoscopic optical apparatus according to claim 8 wherein a surface of said field lens is substantially concentric with said left image center of curvature.

11. An autostereoscopic optical apparatus according to claim 1 further comprising a focusing optical element adjacent to said left image source for directing light toward said left mirror center of curvature.

12. An autostereoscopic optical apparatus according to claim 11 wherein said focusing optical element is taken from the group consisting of a Fresnel lens, a holographic optical element, a diffraction optical element, and a lens.

13. An autostereoscopic optical apparatus according to claim 1 wherein said left ball lens segment comprises a hemispheric lens with a reflective surface.

14. An autostereoscopic optical apparatus according to claim 1 wherein said left ball lens segment comprises at least one meniscus lens segment.

15. An autostereoscopic optical apparatus for viewing a stereoscopic virtual image comprising a left image to be viewed by an observer at a left viewing pupil and a right image to be viewed by the observer at a right viewing pupil, the apparatus comprising:
(a) a left image generation system and a right image generation system, each image generation system comprising:
    (i) an image generation curved mirror having a mirror center of curvature;
    (ii) an image generation beamsplitter disposed between the vertex of said image generation curved mirror and said mirror center of curvature;
    (iii) an image source for directing image-bearing light toward said image generation curved mirror;
    said image generation curved mirror cooperating with said image generation beamsplitter to form an intermediate image of said image source, said intermediate image having an image center of curvature;
    (iv) a field lens disposed near said intermediate image for imaging said mirror center of curvature toward said image center of curvature; and
    (v) a ball lens segment, centered about said image center of curvature, for forming a curved image from said intermediate image;
said left image generation forming a left curved image and said right image generation system forming a right curved image thereby;
(b) a pupil imaging curved mirror having a focal surface and having a pupil imaging center of curvature, said pupil imaging center of curvature disposed substantially optically midway between said ball lens segment for said left image generation system and said ball lens segment for said right image generation system; and (c) a third beamsplitter disposed between said focal surface and said pupil imaging center of curvature, said pupil imaging spherical mirror and said third beamsplitter cooperating to form a real image of said ball lens segment for said left image generation system at the left viewing pupil and to form a real image of said ball lens segment for said right image generation system at the right viewing pupil.

16. An autostereoscopic optical apparatus according to claim 15 wherein at least one of said left or said right image generation systems further comprise a corrector element disposed near the center of curvature of said image generation curved mirror.

17. An autostereoscopic optical apparatus according to claim 16 wherein said corrector element comprises an aspheric surface.

18. An autostereoscopic optical apparatus according to claim 16 wherein said corrector element comprises a compound lens.

19. An autostereoscopic optical apparatus according to claim 15 wherein said image generation beamsplitter is cross sectionally wedge-shaped.

20. An autostereoscopic optical apparatus according to claim 15 wherein said image generation beamsplitter is a pellicle.

21. An autostereoscopic optical apparatus according to claim 15 wherein said image source is taken from the group consisting of a CRT, an emissive array, an LCD display, an OLED.

22. An autostereoscopic optical apparatus according to claim 15 wherein a surface of said field lens is substantially concentric with said mirror center of curvature.

23. An autostereoscopic optical apparatus according to claim 15 wherein a surface of said field lens is substantially concentric with said mirror center of curvature.

24. An autostereoscopic optical apparatus according to claim 15 further comprising a focusing optical element adjacent to said image source for directing light toward said mirror center of curvature.

25. An autostereoscopic optical apparatus according to claim 24 wherein said focusing optical element is taken from the group consisting of a Fresnel lens, a holographic optical element, a diffraction optical element, and a lens.

26. An autostereoscopic optical apparatus according to claim 15 wherein said ball lens segment comprises a hemispheric lens with a reflective surface.

27. An autostereoscopic optical apparatus according to claim 15 wherein said ball lens segment comprises at least one meniscus lens segment.

28. An autostereoscopic optical apparatus for viewing a stereoscopic virtual image comprising a left image to be viewed by an observer at a left viewing pupil and a right image to be viewed by the observer at a right viewing pupil, the apparatus comprising:
(a) a left image generation system and a right image generation system, each image generation system comprising:
   (i) an image generation curved mirror having a mirror center of curvature;
   (ii) an image generation beamsplitter disposed between the vertex of said image generation curved mirror and said mirror center of curvature;
   (iii) an image source for directing image-bearing light toward said image generation curved mirror,
   said image generation curved mirror cooperating with said image generation beamsplitter to form an intermediate image of said image source, said intermediate image having an image center of curvature; and
   (iv) a ball lens segment, centered about said image center of curvature, for forming a curved image from said intermediate image;
said left image generation forming a left curved image and said right image generation system forming a right curved image thereby;
(b) a pupil imaging curved mirror having a focal surface and having a pupil imaging center of curvature, said pupil imaging center of curvature disposed substantially optically midway between said ball lens segment for said left image generation system and said ball lens segment for said right image generation system; and
(c) a third beamsplitter disposed between said focal surface and said pupil imaging center of curvature, said pupil imaging spherical mirror and said third beamsplitter cooperating to form a real image of said ball lens segment for said left image generation system at the left viewing pupil and to form a real image of said ball lens segment for said right image generation system at the right viewing pupil.

29. An autostereoscopic optical apparatus according to claim 28 wherein at least one of said left image generation system and a right image generation systems further comprises a field lens, disposed near said intermediate image formed by said image generation beamsplitter and said image generation curved mirror, for imaging said mirror center of curvature toward said image center of curvature.

30. An autostereoscopic optical apparatus according to claim 28 wherein at least one of said left or said right image generation systems further comprise a corrector element disposed near the center of curvature of said image generation curved mirror.

31. An autostereoscopic optical apparatus according to claim 30 wherein said corrector element comprises an aspheric surface.

32. An autostereoscopic optical apparatus according to claim 30 wherein said corrector element comprises a compound lens.

33. An autostereoscopic optical apparatus according to claim 28 wherein said image generation beamsplitter is cross sectionally wedge-shaped.

34. An autostereoscopic optical apparatus according to claim 28 wherein said image generation beamsplitter is a pellicle.

35. An autostereoscopic optical apparatus according to claim 28 wherein said image source is taken from the group consisting of a CRT, an emissive array, an LCD display, an OLED.

36. An autostereoscopic optical apparatus according to claim 29 wherein a surface of said field lens is substantially concentric with said mirror center of curvature.

37. An autostereoscopic optical apparatus according to claim 29 wherein a surface of said field lens is substantially concentric with said mirror center of curvature.

38. An autostereoscopic optical apparatus according to claim 28 further comprising a focusing optical element adjacent to said image source for directing light toward said mirror center of curvature.

39. An autostereoscopic optical apparatus according to claim 38 wherein said focusing optical element is taken from the group consisting of a Fresnel lens, a holographic optical element, a diffraction optical element, and a lens.

40. An autostereoscopic optical apparatus according to claim 28 wherein said ball lens segment comprises a hemispheric lens with a reflective surface.

41. An autostereoscopic optical apparatus according to claim 28 wherein said ball lens segment comprises at least one meniscus lens segment.

42. An autostereoscopic optical apparatus for viewing a stereoscopic virtual image comprising a left image to be viewed by an observer at a left viewing pupil and a right image to be viewed by the observer at a right viewing pupil, the apparatus comprising:
(a) a left image generation system for forming a left curved intermediate image comprising:
   (i) a left curved mirror having a left mirror center of curvature;
   (ii) a left beamsplitter disposed between the vertex of said left curved mirror and said left mirror center of curvature;
   (iii) a left image source for providing light from the left image to said left curved mirror, said left curved mirror cooperating with said left beamsplitter to form a left intermediate image of said left image source, said left intermediate image having a left image center of curvature;
   (iv) a left ball lens segment, centered about said left image center of curvature, for forming said left curved intermediate image from said left intermediate image of said left image source;
(b) a right image generation system for forming a right curved intermediate image comprising:
   (i) a right curved mirror having a right mirror center of curvature;
   (ii) a right beamsplitter disposed between the vertex of said right curved mirror and said right mirror center of curvature;
   (iii) a right image source for providing light from the right image to said right curved mirror, said right curved mirror cooperating with said right beamsplitter to form a right intermediate image of said right image source, said right intermediate image having a right image center of curvature;
   (iv) a right ball lens segment, centered about said right image center of curvature, for forming said right curved intermediate image from said right intermediate image of said right image source;
(c) a left ball lens imaging curved mirror having a left focal surface and having a left ball lens imaging center of curvature, wherein said left curved intermediate image from said left image generation system lies substantially on said left focal surface;
(d) a right ball lens imaging curved mirror having a right focal surface and having a right ball lens imaging center of curvature, wherein said right curved intermediate image from said right image generation system lies substantially on said right focal surface;
(e) a third beamsplitter disposed at a position along the optical path between said left focal surface and said left ball lens center of curvature and between said right focal surface and said right ball lens center of curvature;
said third beamsplitter cooperating with said left ball lens imaging curved mirror to form, at the left viewing pupil:
   (i) a real image of said left ball lens segment; and,
   (ii) a virtual image of said left curved intermediate image;
said third beamsplitter further cooperating with said right ball lens imaging curved mirror to form, at the right viewing pupil:
   (i) a real image of said right ball lens segment; and
   (ii) a virtual image of said right curved intermediate image.

43. An autostereoscopic optical apparatus according to claim 42 further comprising a left corrector element disposed near the center of curvature of said left curved mirror.

44. An autostereoscopic optical apparatus according to claim 43 wherein said left corrector element comprises an aspheric surface.

45. An autostereoscopic optical apparatus according to claim 43 wherein said left corrector element comprises a compound lens.

46. An autostereoscopic optical apparatus according to claim 42 wherein said left beamsplitter is cross sectionally wedge-shaped.

47. An autostereoscopic optical apparatus according to claim 42 wherein said left beamsplitter is a pellicle.

48. An autostereoscopic optical apparatus according to claim 42 wherein said left image source is taken from the group consisting of a CRT, an emissive array, an LCD display, an OLED.

49. An autostereoscopic optical apparatus according to claim 42 further comprising a field lens disposed between said left mirror center of curvature and the focal point of said left curved mirror for imaging said left mirror center of curvature toward said left image center of curvature.

50. An autostereoscopic optical apparatus according to claim 49 wherein a surface of said field lens is substantially concentric with said left mirror center of curvature.

51. An autostereoscopic optical apparatus according to claim 49 wherein a surface of said field lens is substantially concentric with said left image center of curvature.

52. An autostereoscopic optical apparatus according to claim 42 further comprising a focusing optical element adjacent to said left image source for directing light toward said left mirror center of curvature.

53. An autostereoscopic optical apparatus according to claim 52 wherein said focusing optical element is taken from the group consisting of a Fresnel lens, a holographic optical element, a diffraction optical element, and a lens.

54. An autostereoscopic optical apparatus according to claim 42 wherein said left ball lens segment comprises a hemispheric lens with a reflective surface.

55. An autostereoscopic optical apparatus according to claim 45 wherein said left ball lens segment comprises at least one meniscus lens segment.

56. An autostereoscopic optical apparatus for viewing a stereoscopic virtual image comprising a left image to be viewed by an observer at a left viewing pupil and a right image to be viewed by the observer at a right viewing pupil, the apparatus comprising:
(a) a left image generation system and a right image generation system, each image generation system comprising:
   (i) an image generation curved mirror having a mirror center of curvature;
   (ii) an image generation beamsplitter disposed between the vertex of said image generation curved mirror and said mirror center of curvature;
   (iii) an image source for directing image-bearing light toward said image generation curved mirror;
   said image generation curved mirror cooperating with said image generation beamsplitter to form an intermediate image of said image source, said intermediate image having an image center of curvature;
   (iv) a field lens disposed near said intermediate image for imaging said mirror center of curvature toward said image center of curvature; and,
   (v) a ball lens segment, centered about said image center of curvature, for forming a curved image from said intermediate image;

said left image generation forming a left curved image and said right image generation system forming a right curved image thereby;

(b) a left pupil imaging curved mirror having a left focal surface and having a left pupil imaging center of curvature, said ball lens segment for said left image generation system centered about said left pupil imaging center of curvature;

(c) a right pupil imaging curved mirror having a right focal surface and having a right pupil imaging center of curvature, said ball lens segment for said right image generation system centered about said right pupil imaging center of curvature;

(d) a third beamsplitter disposed at a position along the optical path between said left focal surface and said left pupil imaging center of curvature and between said right focal surface and said right pupil imaging center of curvature;

said third beamsplitter cooperating with said left pupil imaging curved mirror to form, at the left viewing pupil:
(i) a real image of said ball lens segment for said left image generation system; and
(ii) a virtual image of said left curved image;

said third beamsplitter further cooperating with said right pupil imaging curved mirror to form, at the right viewing pupil:
(i) a real image of said right ball lens segment for said right image generation system; and
(ii) a virtual image of said right curved image.

57. An autostereoscopic optical apparatus according to claim 56 wherein at least one of said left or said right image generation systems further comprise a corrector element disposed near the center of curvature of said image generation curved mirror.

58. An autostereoscopic optical apparatus according to claim 57 wherein said corrector element comprises an aspheric surface.

59. An autostereoscopic optical apparatus according to claim 57 wherein said corrector element comprises a compound lens.

60. An autostereoscopic optical apparatus according to claim 56 wherein said image generation beamsplitter is cross sectionally wedge-shaped.

61. An autostereoscopic optical apparatus according to claim 56 wherein said image generation beamsplitter is a pellicle.

62. An autostereoscopic optical apparatus according to claim 56 wherein said image source is taken from the group consisting of a CRT, an emissive array, an LCD display, an OLED.

63. An autostereoscopic optical apparatus according to claim 56 wherein a surface of said field lens is substantially concentric with said mirror center of curvature.

64. An autostereoscopic optical apparatus according to claim 56 wherein a surface of said field lens is substantially concentric with said mirror center of curvature.

65. An autostereoscopic optical apparatus according to claim 56 further comprising a focusing optical element adjacent to said image source for directing light toward said mirror center of curvature.

66. An autostereoscopic optical apparatus according to claim 65 wherein said focusing optical element is taken from the group consisting of a Fresnel lens, a holographic optical element, a diffraction optical element, and a lens.

67. An autostereoscopic optical apparatus according to claim 56 wherein said ball lens segment comprises a hemispheric lens with a reflective surface.

68. An autostereoscopic optical apparatus according to claim 56 wherein said ball lens segment comprises at least one meniscus lens segment.

69. A method for forming an autostereoscopic virtual image comprising a left image to be viewed by an observer at a left viewing pupil and a right image to be viewed by the observer at a right viewing pupil, the method comprising:

(a) forming a left curved intermediate image by:
(i) providing a left curved mirror having a left mirror center of curvature;
(ii) disposing a left beamsplitter between the vertex of said left curved mirror and said left mirror center of curvature;
(iii) forming a left intermediate image having a left image center of curvature by directing image-bearing light from a left image source through said left beamsplitter to said left curved mirror;
(iv) forming said left curved intermediate image from said left intermediate image of said left image source through a left ball lens segment, centered about said left image center of curvature;

(b) forming a right curved intermediate image by:
(i) providing a right curved mirror having a right mirror center of curvature;
(ii) disposing a right beamsplitter between the vertex of said right curved mirror and said right mirror center of curvature;
(iii) forming a right intermediate image having a right image center of curvature by directing image-bearing light from a right image source through said right beamsplitter to said right curved mirror;
(iv) forming said right curved intermediate image from said right intermediate image of said right image source through a right ball lens segment, centered about said right image center of curvature;

(c) providing a ball lens imaging curved mirror having a focal surface and having a center of curvature, said center of curvature placed substantially optically midway between said left ball lens segment and said right ball lens segment, wherein said left curved intermediate image from said left image generation system and said right curved intermediate image from said right image generation system lie substantially on said focal surface;

(d) disposing a third beamsplitter between said focal surface and said center of curvature of said ball lens imaging curved mirror, said ball lens imaging curved mirror and said third beamsplitter cooperating to form, at the left viewing pupil:
(i) a real image of said left ball lens segment; and
(ii) a virtual image of said left curved intermediate image;

said ball lens imaging curved mirror and said third beamsplitter further cooperating to form, at the right viewing pupil:
(i) a real image of said right ball lens segment; and
(ii) a virtual image of said right curved intermediate image.

70. A method for forming an autostereoscopic virtual image according to claim 69 further comprising the step of directing light through an optical corrector element near the center of curvature of said left curved mirror.

71. A method for forming an autostereoscopic virtual image according to claim 69 wherein the step of forming said left intermediate image comprises the step of energizing a CRT.

72. A method for forming an autostereoscopic virtual image according to claim 69 wherein the step of forming said left intermediate image comprises the step of energizing an emissive array.

73. A method for forming an autostereoscopic virtual image according to claim 69 wherein the step of forming said left intermediate image comprises the step of energizing an LCD.

74. A method for forming an autostereoscopic virtual image according to claim 69 wherein the step of forming said left intermediate image comprises the step of energizing an OLED.

75. A method for forming an autostereoscopic virtual image according to claim 69 further comprising the step of imaging said left mirror center of curvature toward said left image center of curvature through a field lens.

76. A method for forming an autostereoscopic virtual image according to claim 69 wherein the step of forming a left intermediate image comprises the step of directing said image-bearing light from said left image source toward said left mirror center of curvature.

77. A method for forming an autostereoscopic virtual image according to claim 69 wherein the step of forming said left curved intermediate image comprises the step of using an hemispheric lens with a reflective surface.

78. A method for forming an autostereoscopic virtual image comprising a left image to be viewed by an observer at a left viewing pupil and a right image to be viewed by the observer at a right viewing pupil, the method comprising:
    (a) forming a left curved intermediate image by:
        (i) providing a left curved mirror having a left mirror center of curvature;
        (ii) disposing a left beamsplitter between the vertex of said left curved mirror and said left mirror center of curvature;
        (iii) forming a left intermediate image having a left image center of curvature by directing image-bearing light from a left image source through said left beamsplitter to said left curved mirror;
        (iv) forming said left curved intermediate image from said left intermediate image of said left image source through a left ball lens segment, centered about said left image center of curvature;
    (b) forming a right curved intermediate image by:
        (i) providing a right curved mirror having a right mirror center of curvature;
        (ii) disposing a right beamsplitter between the vertex of said right curved mirror and said right mirror center of curvature;
        (iii) forming a right intermediate image having a right image center of curvature by directing image-bearing light from a right image source through said right beamsplitter to said right curved mirror;
        (iv) forming said right curved intermediate image from said right intermediate image of said right image source through a right ball lens segment, centered about said right image center of curvature;
    (c) providing a left ball lens imaging curved mirror having a left focal surface and having a left ball lens imaging center of curvature, wherein said left curved intermediate image from said left image generation system lies substantially on said left focal surface;
    (d) providing a right ball lens imaging curved mirror having a right focal surface and having a right ball lens imaging center of curvature, wherein said right curved intermediate image from said right image generation system lies substantially on said right focal surface;
    (e) disposing a third beamsplitter at a position along the optical path between said left focal surface and said left ball lens center of curvature and between said right focal surface and said right ball lens center of curvature;
    said third beamsplitter cooperating with said left ball lens imaging curved mirror to form, at the left viewing pupil:
        (i) a real image of said left ball lens segment; and
        (ii) a virtual image of said left curved intermediate image;
    said third beamsplitter further cooperating with said right ball lens imaging curved mirror to form, at the right viewing pupil:
        (i) a real image of said right ball lens segment; and
        (ii) a virtual image of said right curved intermediate image.

79. A method for forming an autostereoscopic virtual image according to claim 78 further comprising the step of directing light through an optical corrector element near the center of curvature of said left curved mirror.

80. A method for forming an autostereoscopic virtual image according to claim 78 wherein the step of forming said left intermediate image comprises the step of energizing a CRT.

81. A method for forming an autostereoscopic virtual image according to claim 78 wherein the step of forming said left intermediate image comprises the step of energizing an emissive array.

82. A method for forming an autostereoscopic virtual image according to claim 78 wherein the step of forming said left intermediate image comprises the step of energizing an LCD.

83. A method for forming an autostereoscopic virtual image according to claim 78 wherein the step of forming said left intermediate image comprises the step of energizing an OLED.

84. A method for forming an autostereoscopic virtual image according to claim 78 further comprising the step of imaging said left mirror center of curvature toward said left image center of curvature through a field lens.

85. A method for forming an autostereoscopic virtual image according to claim 78 wherein the step of forming a left intermediate image comprises the step of directing said image-bearing light from said left image source toward said left mirror center of curvature.

86. A method for forming an autostereoscopic virtual image according to claim 78 wherein the step of forming said left curved intermediate image comprises the step of using an hemispheric lens with a reflective surface.

87. An autostereoscopic optical apparatus for viewing a stereoscopic virtual image comprising a left image to be viewed by an observer at a left viewing pupil and a right image to be viewed by the observer at a right viewing pupil, the apparatus comprising:
    (a) a left pupil imaging system for forming the left image, comprising:
        (i) a left curved mirror having a left mirror center of curvature and a left focal surface;
        (ii) a left image generation system for projecting a left curved image toward the left focal surface;

wherein the exit pupil of the left image generation system and the left curved image center of curvature are substantially coincident and lie substantially at the left mirror center of curvature;

(b) a right pupil imaging system for forming the right image, comprising:
   (i) a right curved mirror having a right mirror center of curvature and a right focal surface;
   (ii) a right image generation system for projecting a right curved image toward the right focal surface, wherein the exit pupil of the right image generation system and the right curved image center of curvature are substantially coincident and lie substantially at the right mirror center of curvature; and (c) a beamsplitter disposed to fold both left and right image paths to form:
   (i) at the left viewing pupil, a real image of the left image generation system pupil and a virtual image of the left curved image; and
   (ii) at the right viewing pupil, a real image of the right image generation system pupil and a virtual image of the right curved image.

88. An autostereoscopic optical apparatus according to claim 87 wherein said left image generation system comprises an image source selected from a group consisting of a CRT, an emissive array, an LCD display, an OLED.

* * * * *